(12) United States Patent
Awad

(10) Patent No.: US 12,015,972 B2
(45) Date of Patent: Jun. 18, 2024

(54) COMMUNICATION SYSTEM

(71) Applicant: NEC Corporation, Tokyo (JP)

(72) Inventor: Yassin Aden Awad, Uxbridge (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/592,649

(22) Filed: Feb. 4, 2022

(65) Prior Publication Data

US 2022/0159435 A1 May 19, 2022

Related U.S. Application Data

(63) Continuation of application No. 16/323,686, filed as application No. PCT/JP2017/028702 on Aug. 8, 2017, now Pat. No. 11,284,235.

(30) Foreign Application Priority Data

| Aug. 9, 2016 | (GB) | 1613710.1 |
| Sep. 28, 2016 | (GB) | 1616492.3 |
| Feb. 3, 2017 | (GB) | 1701845.8 |

(51) Int. Cl.
*H04W 4/70* (2018.01)
*H04L 1/16* (2023.01)
(Continued)

(52) U.S. Cl.
CPC ............. *H04W 4/70* (2018.02); *H04L 1/1607* (2013.01); *H04L 1/1819* (2013.01);
(Continued)

(58) Field of Classification Search
None
See application file for complete search history.

(56) References Cited

U.S. PATENT DOCUMENTS

| 9,220,092 B2 | 12/2015 | Choi | H04L 5/0053 |
| 2011/0044278 A1* | 2/2011 | Astely | H04L 1/1621 370/329 |

(Continued)

FOREIGN PATENT DOCUMENTS

| CN | 101567775 A | 10/2009 |
| CN | 101675697 A | 3/2010 |

(Continued)

OTHER PUBLICATIONS

"3rd Generation Partnership Project; Technical Specification Group Radio Access Network: Study on provision of low-cost Machine-Type Communications (MTC) User Equipments (UEs) based on LTE (Release 12)", 3GPP TR 36.888 V12.0.0. Jun. 2013, 55 pages.

(Continued)

*Primary Examiner* — Steve R Young
(74) *Attorney, Agent, or Firm* — Sughrue Mion, PLLC

(57) ABSTRACT

A communication system is disclosed in which a base station communicates with machine-type-communication (MTC) devices by dividing the base station's cell bandwidth into (non-overlapping) narrowbands and subframes in each narrowband. The base station generates and transmits control information (DCI) for allocating a set of physical resource blocks (PRBs) in a plurality of subframes for an MTC device. After the base station transmits the data, the MTC device generates and transmits an HARQ feedback indicating that i) the data has been successfully received in each one of the plurality of subframes (e.g. a single 'ACK') or ii) the data has not been received in at least one of the plurality of subframes (e.g. a single 'NACK').

6 Claims, 9 Drawing Sheets

(51) Int. Cl.
    *H04L 1/1607*     (2023.01)
    *H04L 1/18*       (2023.01)
    *H04L 1/1812*     (2023.01)
    *H04L 5/00*       (2006.01)
    *H04W 72/04*      (2023.01)
    *H04W 72/0446*    (2023.01)
    *H04W 72/23*      (2023.01)

(52) U.S. Cl.
    CPC .......... *H04L 5/0055* (2013.01); *H04L 5/0092* (2013.01); *H04W 72/0446* (2013.01); *H04W 72/23* (2023.01)

(56) References Cited

U.S. PATENT DOCUMENTS

| | | | |
|---|---|---|---|
| 2013/0102320 A1 | 4/2013 | Suzuki | H04W 72/042 455/452.1 |
| 2013/0163553 A1* | 6/2013 | Lee | H04L 5/0091 370/329 |
| 2013/0223394 A1 | 8/2013 | Nishio | H04L 1/0029 370/329 |
| 2014/0169319 A1 | 6/2014 | Yang et al. | |
| 2014/0269338 A1 | 9/2014 | Jung et al. | |
| 2015/0208415 A1 | 7/2015 | Xu | H04L 1/1822 370/329 |
| 2015/0282208 A1 | 10/2015 | Yi | H04L 1/1851 370/329 |
| 2015/0358111 A1 | 12/2015 | Marinier | H04L 27/0008 370/329 |
| 2016/0127918 A1* | 5/2016 | Yi | H04W 72/048 370/329 |
| 2017/0026940 A1* | 1/2017 | Moulsley | H04L 1/18 |
| 2017/0264419 A1* | 9/2017 | Fakoorian | H04L 5/14 |
| 2018/0019842 A1* | 1/2018 | Fu | H04L 1/1812 |
| 2018/0041997 A1 | 2/2018 | Babaei | H04W 48/16 |
| 2018/0323907 A1* | 11/2018 | Takeda | H04L 5/1469 |
| 2018/0338301 A1* | 11/2018 | Gao | H04W 72/23 |
| 2019/0081743 A1 | 3/2019 | Loehr | H04L 1/1887 |
| 2020/0196281 A1 | 6/2020 | Bergman et al. | |

FOREIGN PATENT DOCUMENTS

| | | |
|---|---|---|
| WO | 2013/054696 A1 | 4/2013 |
| WO | 2013/141603 A1 | 9/2013 |
| WO | 2014/110907 A1 | 7/2014 |
| WO | 2015/110317 A1 | 7/2015 |
| WO | 2015/136866 A1 | 9/2015 |
| WO | 2016/121911 A1 | 8/2016 |

OTHER PUBLICATIONS

"3rd Generation Partnership Project:Technical Specification Group Services and System Aspects; Study on architecture enhancements for Cellular Internet of Things (Release 13)", 3GPP TR 33.730 V13.0.0. Mar. 2016, 94 pages.

"3rd Generation Partnership Project;Technical Specification Group Services and System Aspects; Service requirements for Machine-Type Communications (MTC):Stage 1, (Release 13)" 3GPP TS 22.368 TS V13.1.0, Dec. 2014, 26 pages.

"3rd Generation Partnership Project: Technical Specification Group Radio Access Network; Evolved Universal Terrestrial Radio Access (E-UTRA); Multiplexing and channel coding, (Release 13)", 3GPP TS 32.212 V13.2.0, Jun. 2016, 140 pages.

"3rd Generation Partnership Project; Technical Specification Group Radio Access Network; Evolved Universal Terrestrial Radio Access (E-UTRA); Physical layer procedures, (Release 13)", 3GPP TS 32.213 V13.2.0, Jun. 2016, 381 pages.

Shiann-Tsong Sheu et al., "A Go-back-N HARQ Time bundling for Machine Type Communication Devices in LTE TDD", 2013 IEEE Wireless Communications and Networking Conference (WCNC): MAC, Apr. 2013, 6 pages.

United Kingdon Search Report for GB1613710.1 dated Jan. 27, 2017.

International Search Report for PCT/JP2017/028702 dated Oct. 17, 2017 [PCT/ISA/210].

Written Opinion for PCT/JP2017/028702 dated Oct. 17, 2017 [PCT/ISA/237].

Communication dated Dec. 3, 2019, issued by the Japan Patent Office in application No. 2019-505202.

Communication dated Aug. 20, 2020, from the Intellectual Property of India application No. 201917004023.

Communication dated Nov. 30, 2020, issued by the China National Intellectual Property Administration in application No. 201780048777.7.

Chinese Office Communication for CN Application No. 201780048777.7 dated Dec. 17, 2021 with English Translation.

Japanese Office Action for JP Application No. 2021-214354 dated Jan. 24, 2023 with English Translation.

* cited by examiner

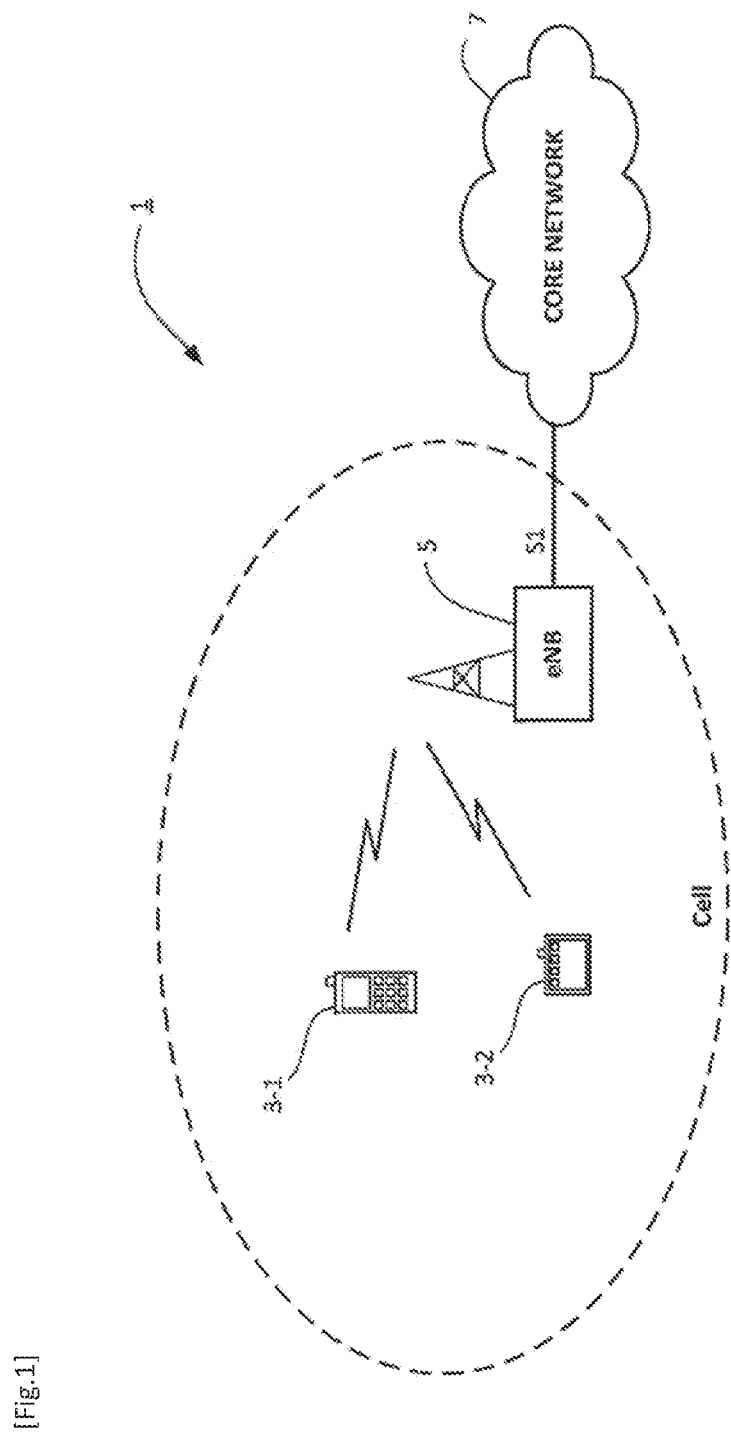
[Fig.1]

[Fig. 2]
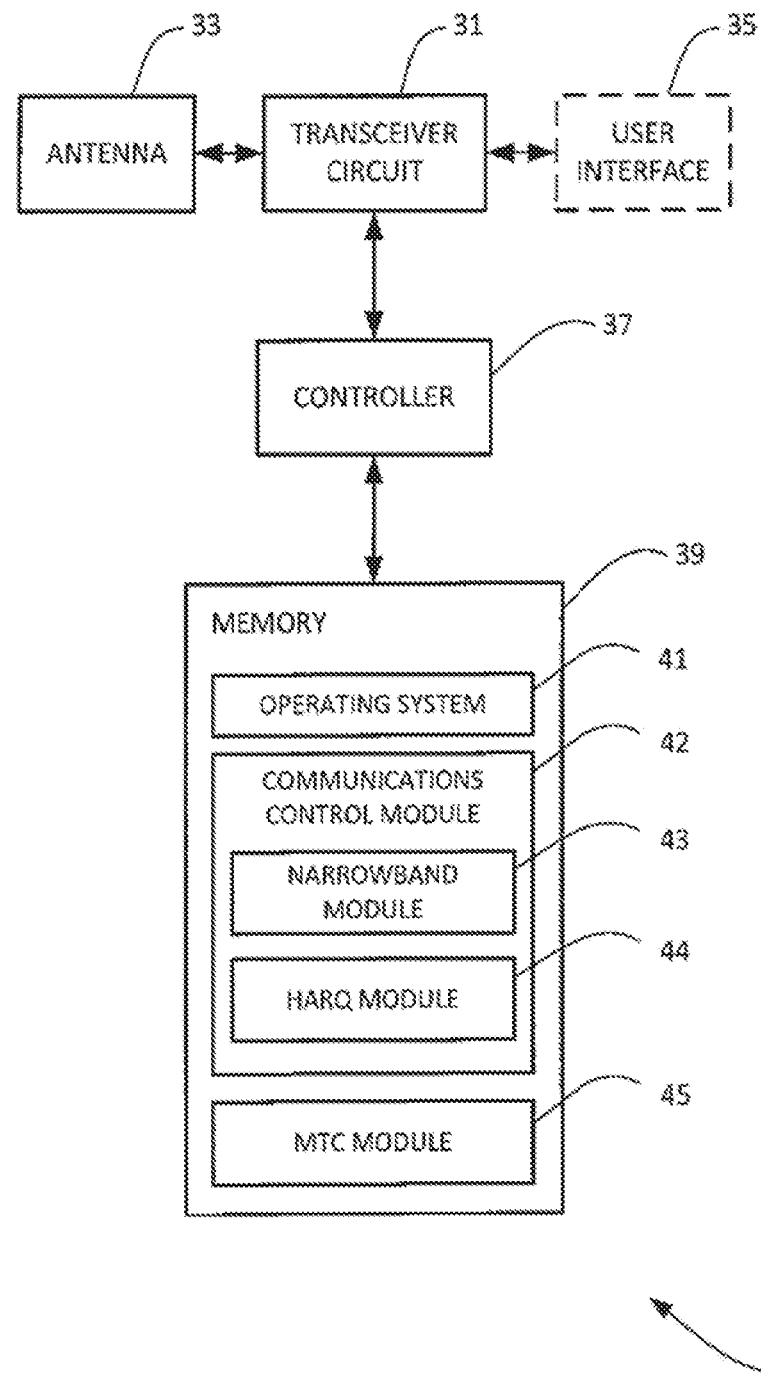

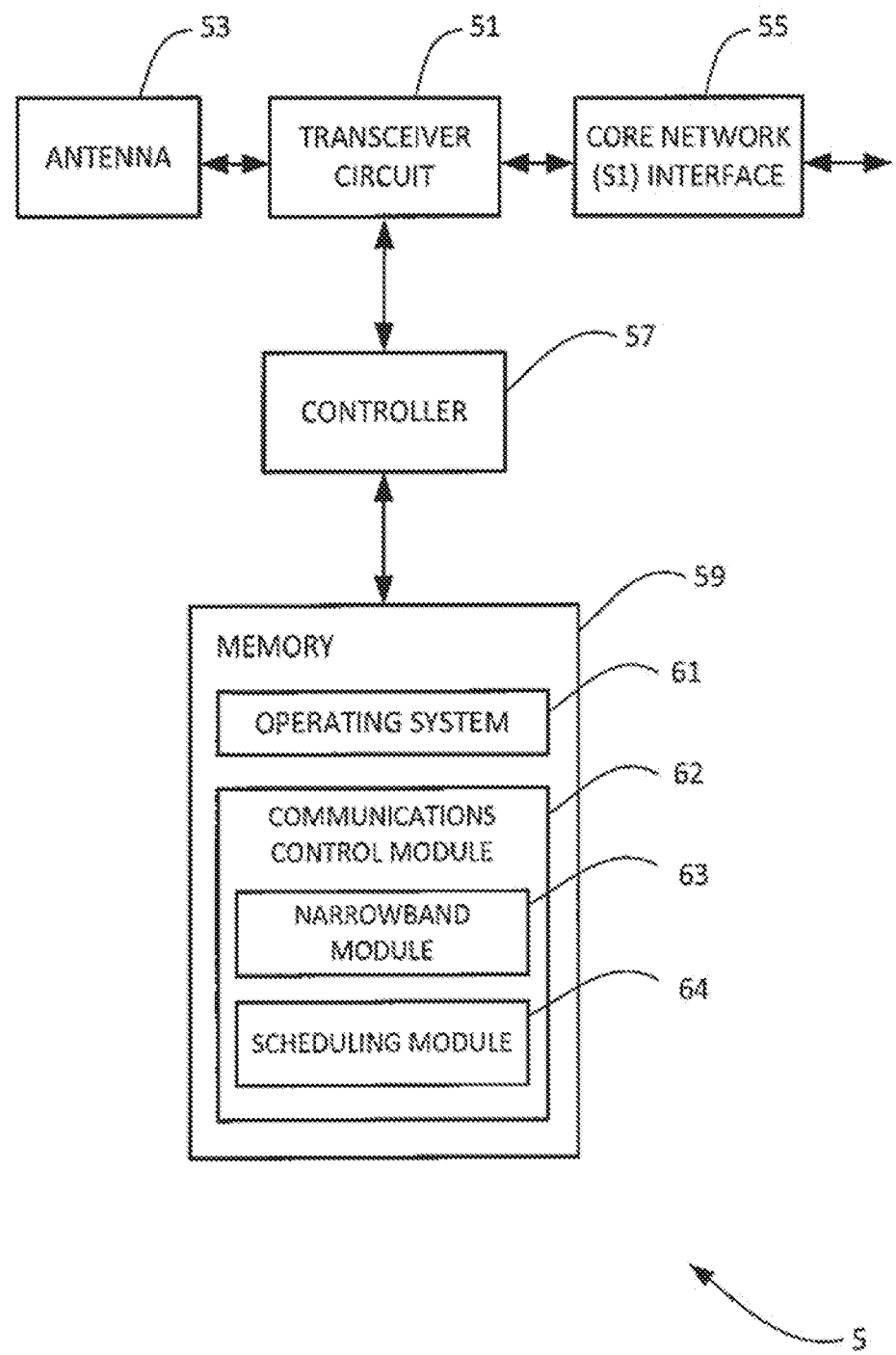
[Fig. 3]

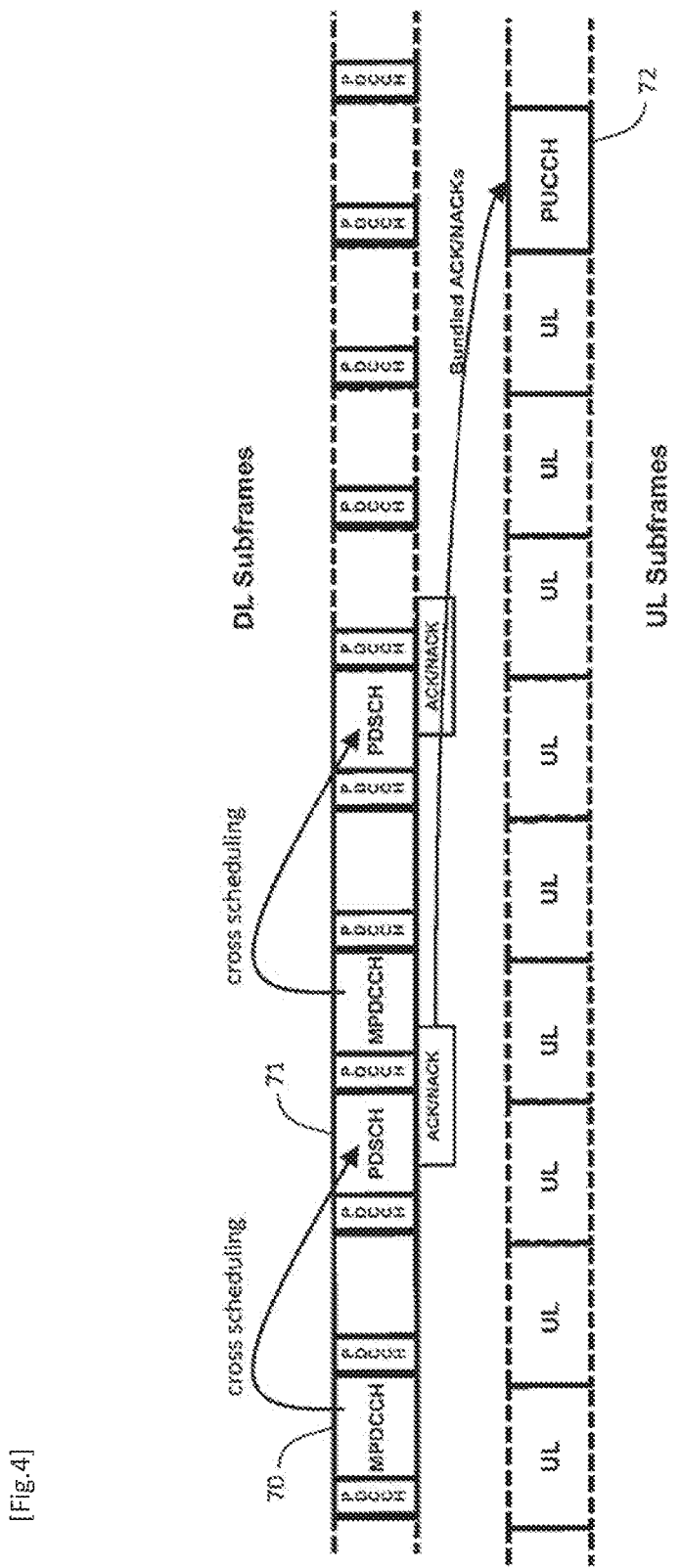
[Fig.4]

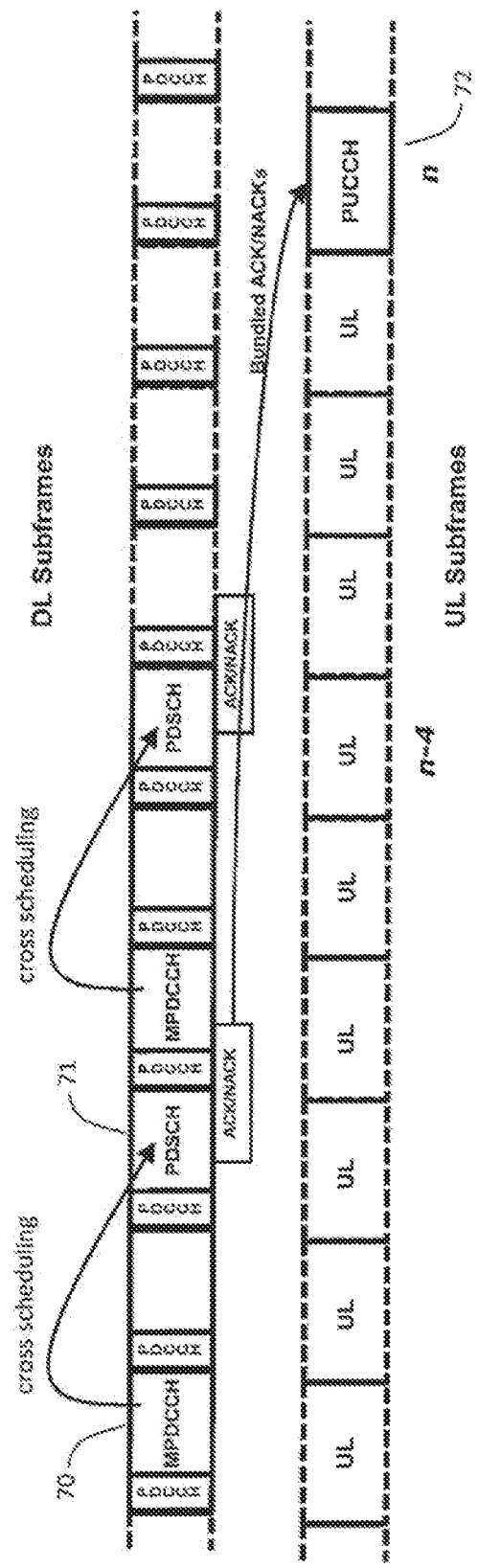

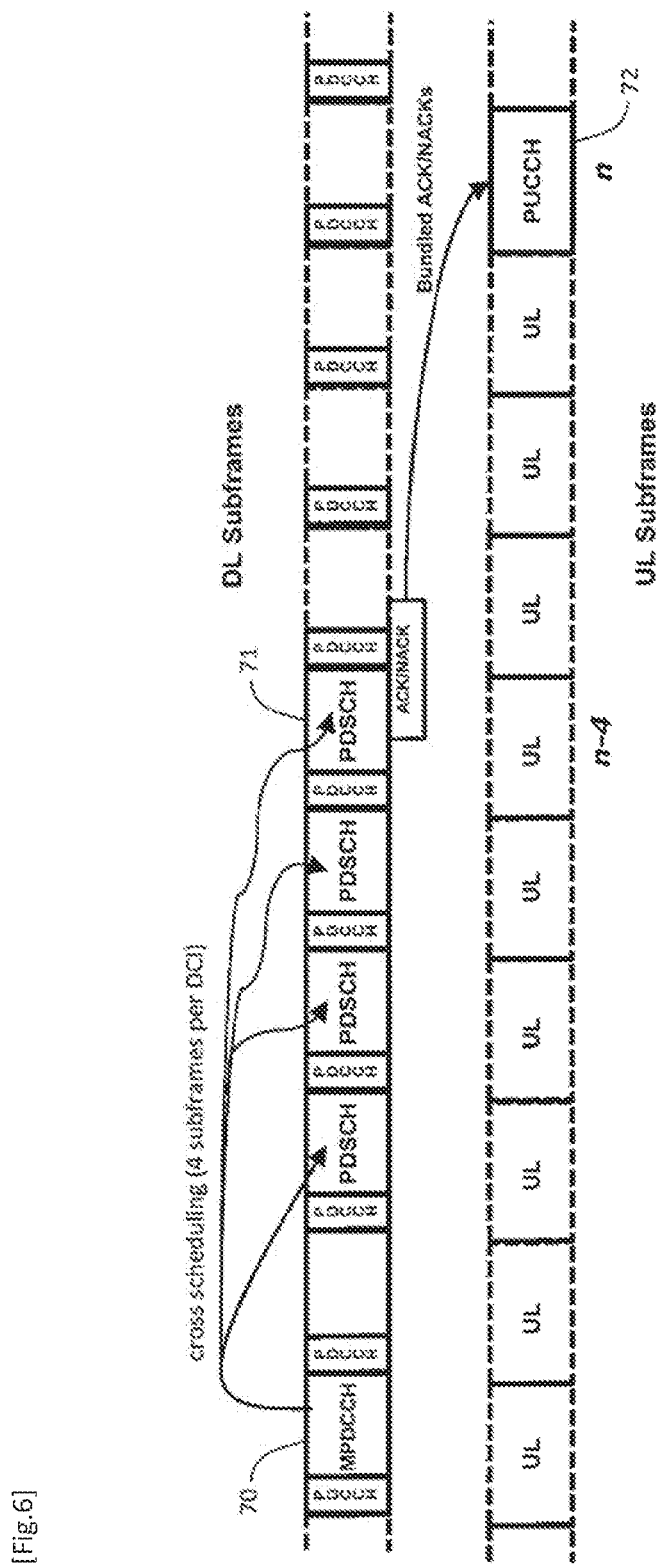

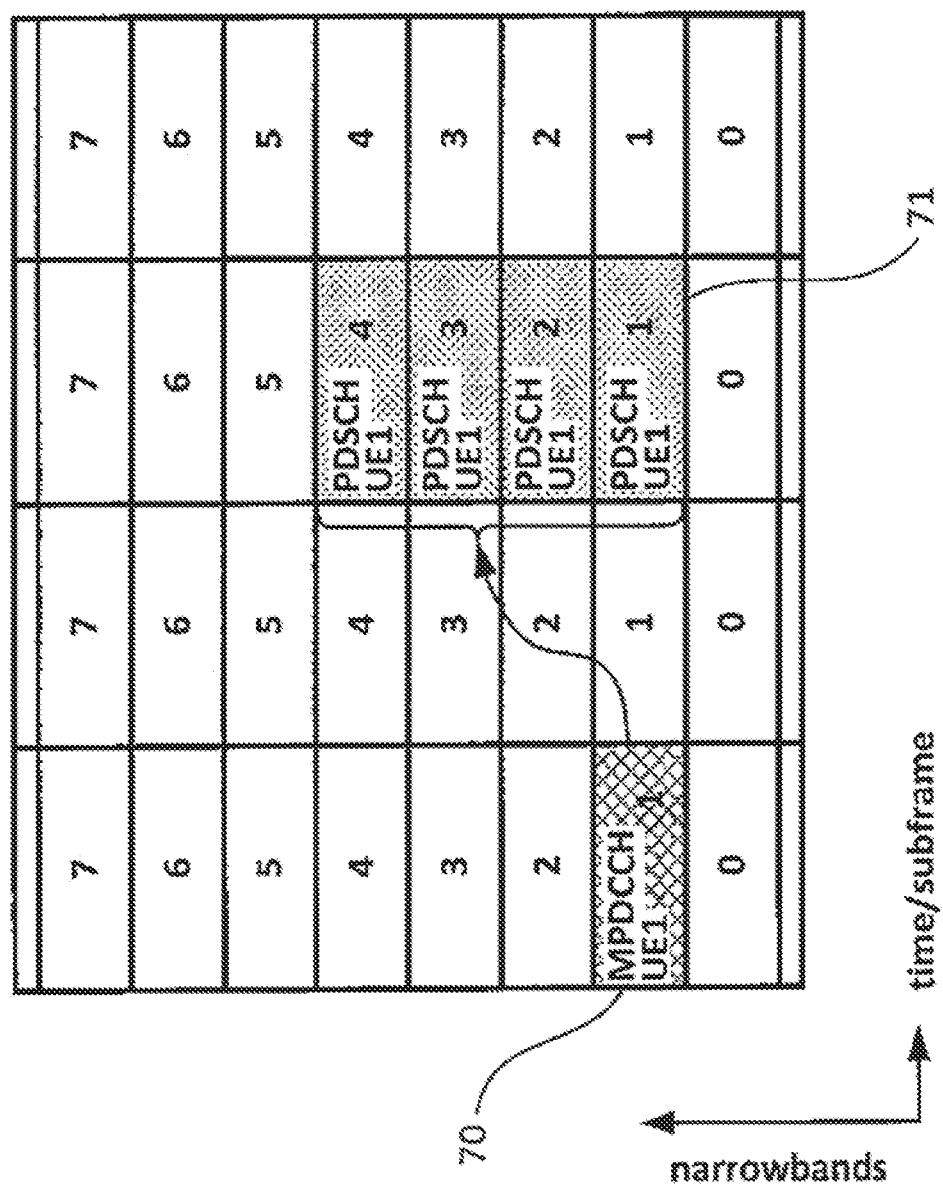
[Fig.7]

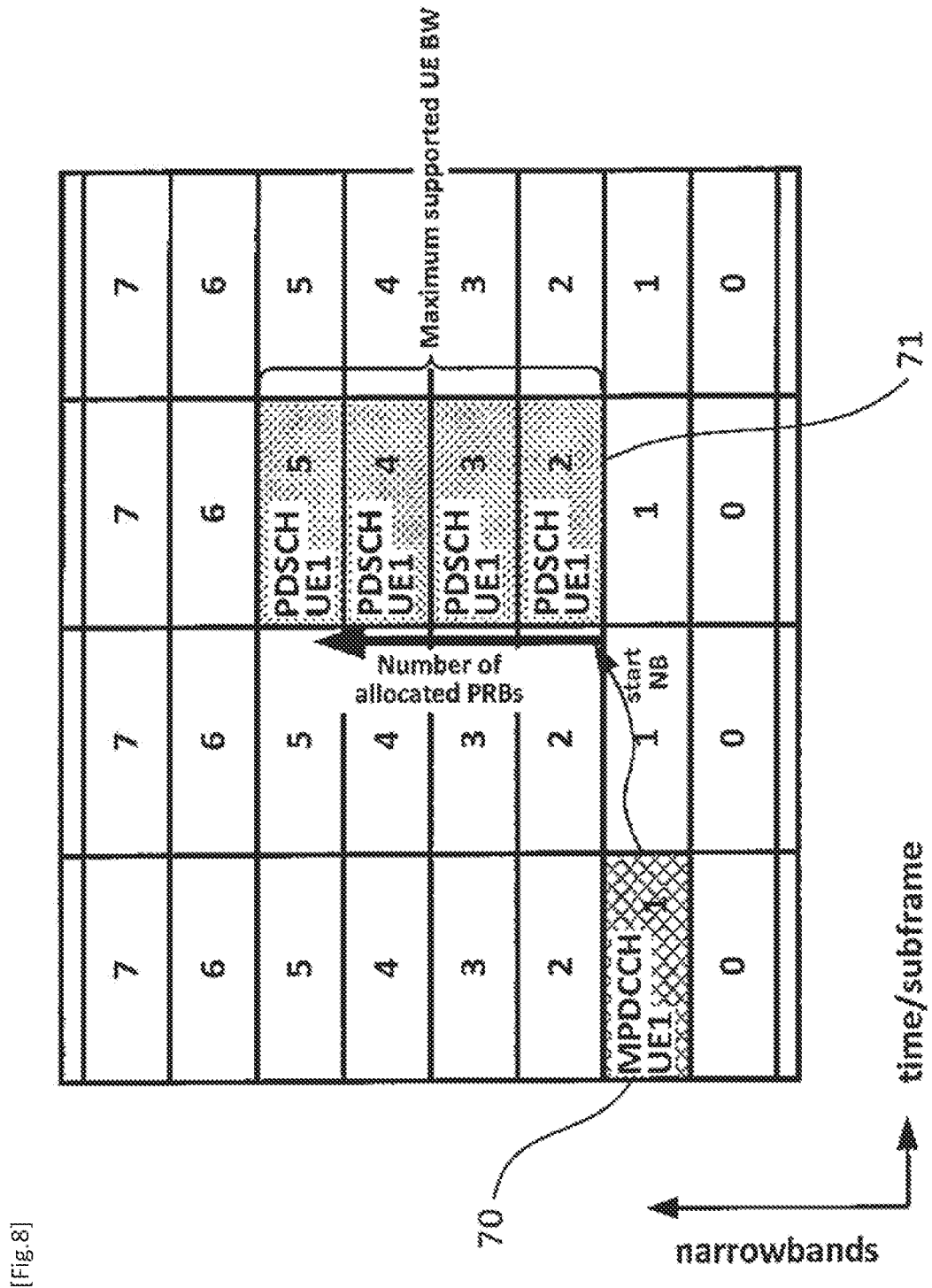
[Fig. 8]

[Fig. 9]
Narrowband positions and numbering (BW = 10MHz case)
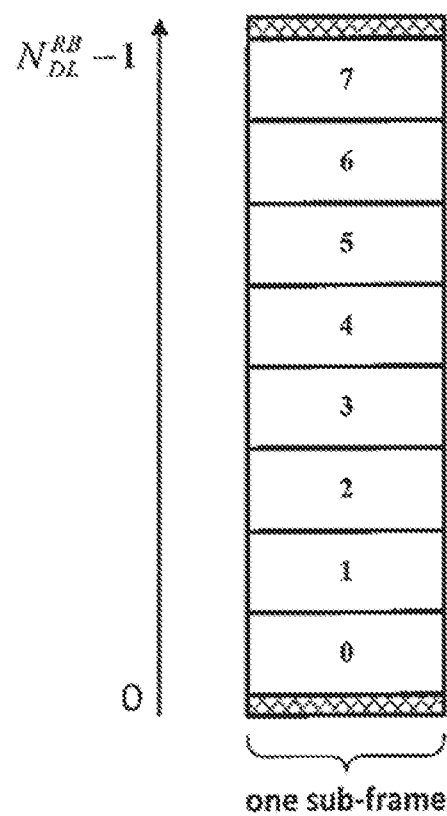

COMMUNICATION SYSTEM

CROSS-REFERENCE TO RELATED APPLICATIONS

The present application is a continuation application of U.S. patent application Ser. No. 16/323,686 filed on Feb. 6, 2019, which is a National Stage Entry of international application PCT/JP2017/028702, filed on Aug. 8, 2017, which claims the benefit of priority from United Kingdom Patent Applications 1613710.1 filed on Aug. 9, 2016, 1616492.3 filed on Sep. 28, 2016 and 1701845.8 filed on Feb. 3, 2017, the disclosures of all of which are incorporated in their entirety by reference herein.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to high data rate transmissions for machine-type communication devices.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

The latest developments of the 3GPP standards are referred to as the Long Term Evolution (LTE) of Evolved Packet Core (EPC) network and Evolved UMTS Terrestrial Radio Access Network (E-UTRAN), including LTE-Advanced. Under the 3GPP standards, a NodeB (or an eNB in LTE) is the base station via which communication devices connect to a core network and communicate to other communication devices or remote servers. For simplicity, the present application will use the term base station to refer to any such base stations. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user.

3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application refers to MTC devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

MTC devices connect to the network to send data to or to receive data from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC (IoT) devices have been dealt with in 3GPP technical report (TR) 36.888 V12.0.0 and 3GPP TR 23.720 V13.0.0. Further network requirements relating to MTC devices are disclosed in the 3GPP technical specification (TS) 22.368 V13.1.0. The contents of these 3GPP documents are incorporated herein by reference.

The provision of IoT and other machine-type communication devices via cellular networks is proving to be a significant opportunity for mobile operators. In Release 13 (Rel-13) version of the 3GPP standards, two classes of low-cost IoT devices with enhanced coverage and long battery life are specified: enhanced MTC (eMTC) devices and narrowband IoT (NB-IoT) devices supporting UE bandwidths of 6 PRBs and 1 PRB, respectively (1 PRB=a 180 kHz physical resource block). Thus, some MTC devices (which may be referred to as 'reduced bandwidth MTC devices') will support only a limited bandwidth (typically 1.4 MHz or 180 kHz in downlink and uplink) compared to the total LTE bandwidth. This allows such reduced bandwidth MTC devices to be made more economically (having fewer/simplified components) compared to MTC devices and other communication devices supporting a larger bandwidth and/or having more complicated components.

As LTE system bandwidths are typically larger than 1.4 MHz (i.e. up to 20 MHz), the system bandwidth is divided into a plurality of 'narrowbands' (or 'sub-bands'), each narrowband comprising a maximum of six physical resource blocks (PRBs), which is the maximum number of PRBs that a 1.4 MHz bandwidth limited MTC device can use in LTE.

In order to mitigate the risk of MTC devices not receiving some transmissions (for example, due to lack of network coverage (e.g. when deployed indoors), in combination with the often limited functionality of MTC devices), it has also been proposed to increase the coverage of certain LTE transmissions (channels) for MTC devices. One approach for the enhancement of coverage for MTC devices is the repetition of the same information across multiple (e.g. two, three, four, or more) sub-frames. In other words, for coverage enhanced MTC devices, the base station duplicates the transmitted information in the time domain (the base station re-transmits the same information in one or more sub-frames subsequent to the sub-frame in which that information is first sent). A coverage enhanced MTC device can be configured to combine the multiple copies of the (same) information received in the multiple sub-frames, and after combining the received information, the coverage enhanced MTC device is more likely to be able to decode transmitted data successfully than based on a single copy of the information. 3GPP specified two coverage enhancement (CE) modes for MTC devices: CE Mode A, which employs a relatively small number of repetitions (or no repetition at all); and CE Mode B, which employs a large number of repetitions (and may also employ a higher transmission power).

The Rel-13 standards, including the introduction of narrowbands, primarily address complexity reduction, extended battery life, and coverage enhancements for MTC devices such as sensors, meters, smart readers, and similar. The introduction of the NB-IoT type UE category addresses low data rate use cases, (e.g. requiring less than 200 kbps), whilst the introduction of the eMTC type UE category can address data rates in the order of 300 kbps when Half Duplex Frequency Division Duplex (HD-FDD) transmission is employed or 800 kpbs when Full Duplex Frequency Division Duplex (FD-FDD) transmission is employed.

SUMMARY OF INVENTION

Technical Problem

Apart from those MTC devices/use cases that are of primary focus, the Rel-13 standards also meet the requirements of other types of MTC devices/use cases, such as those of voice capable wearable devices and health monitoring devices. However, there is still a subset of MTC devices/use cases that are not fully covered and/or supported by the Rel-13 improvements. For example, MTC devices/use cases requiring higher data rates (e.g. above 1 Mbps), mobility, and MTC devices that support/use delay sensitive services. It is therefore important to address further use cases and support additional types of MTC devices by providing higher data rates (compared to currently possible MTC data rates) and improved support for mobility compared to MTC devices considered in the Rel-13 MTC/eMTC specifications (without sacrificing the power consumption and complexity reduction and link budget enhancements features achieved by the existing Rel-13 eMTC solution).

Accordingly, the present invention seeks to provide systems, devices and methods for at least partially addressing one or more of these issues.

Solution to Problem

In one aspect, the invention provides a base station for a communication system, wherein the base station comprises: a controller operable to generate control information for assigning communication resources for transmitting data to a machine type communication device; and a transceiver operable to: transmit the generated control information to the machine type communication device; transmit data to the machine type communication device using the assigned communication resources; and receive, from the machine type communication device, ACK/NACK feedback for data transmitted to the machine type communication device; wherein the data is transmitted in a number of data bundles in sequence (e.g. physical downlink shared channel 'PDSCH' bundles), each data bundle being transmitted in a sequence of downlink sub-frames; wherein the ACK/NACK feedback comprises respective ACK/NACK feedback for each bundle; wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated.

In another aspect, the invention provides a machine type communication device for a communication system, wherein the machine type communication device comprises: a transceiver operable to receive: control information for assigning communication resources for transmitting data to the machine type communication device; and data using the assigned communication resources, wherein the data is transmitted in a number of data bundles in sequence (e.g. physical downlink shared channel 'PDSCH' bundles), each data bundle being transmitted in a sequence of downlink sub-frames; and a controller operable to generate ACK/NACK feedback for data received by the machine type communication device, wherein the ACK/NACK feedback comprises respective ACK/NACK feedback for each bundle; wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated; and wherein the transceiver is operable to transmit, to the base station, the generated feedback based on the determined starting sub-frame.

In another aspect, the invention provides a base station for a communication system, wherein the base station comprises: a controller operable to generate control information for assigning communication resources for transmitting data to a machine type communication device; and a transceiver operable to transmit the generated control information to the machine type communication device, to transmit data to the machine type communication device using the assigned communication resources, and to receive, from the machine type communication device ACK/NACK feedback for data transmitted to the machine type communication device; wherein the ACK/NACK feedback comprises one ACK/NACK indication for acknowledging data transmitted in a plurality of subframes.

In another aspect, the invention provides a base station for a communication system, wherein the base station comprises: a controller operable to generate control information for assigning communication resources for transmitting data to a machine type communication device, wherein the control information comprises one downlink control indication for assigning at least one of: (i) communication resources in each of a plurality of subframes; and (ii) communication resources in each of a plurality of narrowbands in the same subframe; and a transceiver operable to transmit the generated control information to the machine type communication device, to transmit data to the machine type communication device using the assigned communication resources.

In another aspect, the invention provides a machine type communication device for a communication system, the machine type communication device comprising: a transceiver operable to receive: control information for assigning communication resources for transmitting data to a machine type communication device; and data using the assigned communication resources; and a controller operable to generate ACK/NACK feedback for data received by the machine type communication device, wherein the ACK/NACK feedback comprises one ACK/NACK indication for acknowledging data transmitted in a plurality of subframes; and wherein the transceiver is operable to transmit, to the base station, the generated feedback.

In another aspect, the invention provides a machine type communication device for a communication system, wherein the machine type communication device comprises: a transceiver operable to receive, from a base station: control information for assigning communication resources for transmitting data to the machine type communication device, wherein the control information comprises one downlink control indication for assigning at least one of: (i) communication resources in each of a plurality of subframes; and (ii) communication resources in each of a plurality of narrowbands in the same subframe; and data using the assigned communication resources.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

It will be appreciated that the term 'legacy', as used herein with reference to methods and or apparatus, refers to methods and/or apparatus known to those familiar with the relevant standards at the priority date of this application and in particular, but not exclusively, to methods and/or apparatus as standardised at the priority date (for example, but not limited to, as standardised in Release 13 or earlier of the relevant 3GPP standards).

Example embodiments of the invention will now be described by way of example only with reference to the attached figures in which:

BRIEF DESCRIPTION OF DRAWINGS

FIG. 1 schematically illustrates a telecommunication system to which example embodiments of the invention may be applied;

FIG. 2 is a block diagram illustrating the main components of the communication device shown in FIG. 1;

FIG. 3 is a block diagram illustrating the main components of the base station shown in FIG. 1;

FIG. 4 illustrates an exemplary way in which high data rates can be realised for MTC devices in the system shown in FIG. 1;

FIG. 5 illustrates an exemplary way in which high data rates can be realised for MTC devices in the system shown in FIG. 1;

FIG. 6 illustrates an exemplary way in which high data rates can be realised for MTC devices in the system shown in FIG. 1;

FIG. 7 illustrates an exemplary way in which high data rates can be realised for MTC devices in the system shown in FIG. 1;

FIG. 8 illustrates an exemplary way in which high data rates can be realised for MTC devices in the system shown in FIG. 1; and FIG. 9 illustrates an exemplary way in which MTC device compatible narrowbands may be provided in the system shown in FIG. 1.

DESCRIPTION OF EMBODIMENTS

Overview

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. Although omitted from FIG. 1 for sake of simplicity, the core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to provide a number of control channels, including, for example, a physical downlink control channel (PDCCH) and a physical uplink control channel (PUCCH), and a number of data channels, including, for example, a Physical Downlink Shared Channel (PDSCH) and a Physical Uplink Shared Channel (PUSCH). The PDCCH (or an MTC specific PDCCH, 'MPDCCH') is used by the base station 5 for allocating resources to the communication devices 3 (typically by sending respective UE-specific downlink control information (DCI) to each communication device 3 that has been scheduled in the current scheduling round). The PUCCH is used by the communication devices 3 for sending UE-specific uplink control information (UCI) to the base station 5 (e.g. scheduling requests for sending uplink data, and Hybrid Automatic Repeat Request (HARQ) feedback corresponding to downlink data received using the resources allocated by a DCI). The PDSCH is the main data bearing channel which carries downlink user data, such as downlink data for a particular communication device 3 scheduled via associated DCI signalling. The PDSCH also carries system information relevant to the cell of the base station 5. The PUSCH carries uplink user data from the communication devices 3 using resources allocated by the base station 5 (based on appropriate scheduling request UCI(s) received via the PUCCH).

In order to support reduced bandwidth MTC devices in its cell, the system bandwidth of the base station 5 of FIG. 1 is divided into a plurality of non-overlapping narrowbands (e.g. a maximum of six PRBs per narrowband). The narrowbands within the system bandwidth are allocated such that it is possible to maintain efficient resource allocation signalling for the narrowbands for Rel-13 low complexity MTC UEs.

Each communication device 3 may fall into one or more of categories of UEs. A first category of UEs include conventional (i.e. non-MTC) communication devices, such as mobile telephones, that are capable of communicating over the entire bandwidth available in the cell of the base station 5. A second category of UEs include NB-IoT devices (and/or the like) capable of using a 180 kHz bandwidth only (1 PRB). A third category of UEs include Rd-13 MTC/eMTC devices capable of using up to a 1.4 MHz bandwidth. A fourth category of UEs include 'further enhanced' MTC ('FeMTC') devices which might have more sophisticated circuitry than conventional MTC/eMTC devices and which are capable of using more than a 1.4 MHz bandwidth. In this example, therefore, the second to fourth categories of UEs include various reduced bandwidth UEs (such as MTC devices and optionally mobile telephones when configured with MTC functionality), which may not be able or configured to communicate over the entire bandwidth available in the cell of the base station 5 (although devices in each category may support a different respective bandwidth).

In this example, the mobile telephone 3-1 falls into the first category of UEs, and it may also fall into one or more of the other categories (e.g. when running an MTC application). Therefore, the mobile telephone 3-1 is able to use the entire system bandwidth. On the other hand, the MTC device 3-2 falls into the fourth category of UEs, and it is able to use more than a 1.4 MHz bandwidth (although not the entire system bandwidth). It will be appreciated that the MTC device 3-2 may fall into the second or third UE category when it is operating as an NB-IoT device or an eMTC device, respectively.

Beneficially, this system is configured to support higher/flexible data rates for compatible communication devices (e.g. at least the first and fourth category of UEs) than the data rates that can be achieved using the current (e)MTC standards (using a 1.4 MHz bandwidth/six PRBs).

Specifically, such support for higher data rates may be realised by the base station 5 scheduling its downlink transmissions, for compatible communication devices 3, into multiple (consecutive) downlink subframes during which the scheduled communication devices 3 are not scheduled/required to transmit data (including acknowledgements) in the uplink. Using such a sequence (or sequences) of subframes beneficially allows the communication devices 3 to receive data substantially continuously (and, if appropriate, at a potentially higher data rate than what is currently possible for eMTC devices). The communication devices 3 that are scheduled this way can also avoid retuning to uplink channels for transmitting uplink data and/or feedback during the sequence of downlink subframes. Specifically, in this case, each communication device 3 that is scheduled to receive downlink transmissions over a sequence of subframes is configured to bundle (multiple) HARQ acknowledgements relating to the sequence of subframes, and send a bundled HARQ feedback (e.g. periodically, in a HARQ transmission opportunity) following the last subframe of each sequence of multiple downlink subframes scheduled for that communication device 3.

Effectively, in case of HARQ bundling, the communication device 3 is configured to derive a single acknowledgement feedback by performing a logical "AND" operation for multiple respective ACKs/NACKs for multiple downlink subframes (where data transmissions in each subframe result in a single 'ACK' or 'HACK' for that subframe depending on whether or not the transmission was successful). The communication device 3 is configured to transmit an 'ACK' to the base station 5 if all associated downlink transmissions succeed, otherwise transmit a 'NACK.' if one or more associated downlink transmissions fail. Further details of HARQ bundling are provided below with reference to FIG. 4.

When HARQ acknowledgement bundling is used, the base station 5 has two options for scheduling downlink data for compatible communication devices 3. In a first option, the base station 5 may use one DCI format to schedule transmissions in a single subframe (one DCI per subframe). In this case, a series or appropriately configured DCI formats may be used for indicating, to the scheduled communication device 3, the sequence of subframes that are allocated for downlink data, from which DCI formats the communication device is able to determine which subframe it needs to use for sending the corresponding (bundled) HARQ feedback.

In a second option the base station 5 may use one DCI format to schedule transmissions in multiple subframes (one DCI per multiple subframes). In this case, the communication device 3 is configured to send the corresponding (bundled) HARQ feedback (in an appropriate transmission opportunity) following the last subframe of the multiple subframes scheduled via the DCI.

Advantageously, using appropriate DCI formats and bundled HARQ feedback, the base station 5 is able to schedule a relatively large amount of resources for a particular communication device 3 in an efficient and flexible manner and still be able to determine whether any data needs to be re-transmitted.

Beneficially, in this system, support for higher data rates may also be realised by configuring the base station 5 to operate the PDSCH/PUSCH with increased bandwidth (i.e. a bandwidth higher than 1.4 MHz), at least for HD-FDD transmissions for MTC devices (and other compatible user equipment) operating without any or with only a minor coverage enhancement (referred to as 'CE mode A' operation). It will be appreciated that the option of using an increased PDSCH/PUSCH bandwidth may be combined with the bundled HARQ feedback approach, if appropriate.

There are two ways in which the base station 5 can provide a PDSCH/PUSCH bandwidth above 1.4 MHz. For example, the base station may be configured to reuse legacy (i.e. pre-Rel-13) system bandwidths of 1.4 MHz, 3 MHz, and 5 MHz for its narrowbands as well. However, in this case some MTC devices (e.g. in the second and third UE categories) may not be compatible with some narrowband configurations of this base station 5 (i.e. such 'extended' narrowbands that exceed 6 PRBs/1.4 MHz). Therefore, the base station 5 may be configured to schedule MTC devices in the second and third UE categories only in those narrowbands that do not exceed 1.4 MHz and schedule more enhanced MTC devices (e.g. in the fourth UE category) and conventional UEs (in the first category) in any narrowband (preferably in the 3 MHz and/or 5 MHz narrowbands if a higher data rate is required).

In another example, the base station 5 may be configured to aggregate multiple narrowbands of 6 RBs (1.4 MHz) each for more enhanced MTC devices (e.g. in the fourth UE category) and for related UEs (in the first category). In this case, transmissions for other MTC devices (e.g. in the second and third UE categories) can still be scheduled for a single narrowband (i.e. without any aggregation of narrowbands). Beneficially, each compatible UE/MTC device may be configured to use a larger transmission or reception bandwidth whenever it needs a high data rate (for example two or more consecutive narrowbands may be aggregated to meet the data rate demands of a particular communication device).

In summary, by scheduling compatible MTC devices and other user equipment to communicate i) using a sequence of a plurality of subframes (in the time domain) and/or ii) using extended/aggregated narrowbands it is possible to support a broad variety of MTC devices and use cases, and in a flexible manner, in addition to what is currently possible using the present (Rel-13) eMTC standards. Beneficially, the above described techniques also comply with and may even improve upon the existing power consumption and complexity reduction features specified for Rel-13 eMTC.

Communication Device

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3. However this user interface 35 may be omitted for some MTC devices.

The operation of the transceiver circuit 31 is controlled by a controller 37 in accordance with software stored in a memory 39. The software includes, among other things, an operating system 41, a communications control module 42, and an MTC module 45.

The communications control module 42 controls communications between the communication device 3 and the base station 5 and/or other communication nodes (via the base station 5). As shown in FIG. 2, the communications control module 42 includes, amongst others, a narrowband module 43 and a HARQ module 44. The narrowband module 43 is responsible for identifying and using narrowbands within the system bandwidth. The HARQ module 44 is responsible for generating and sending, to the serving base station 5, appropriate acknowledgements (ACK/NACK) for downlink transmissions from the serving base station 5. When appropriate, the HARQ module 44 may be configured to bundle acknowledgements and send a (single) 'bundled' ACK/NACK for multiple downlink transmissions.

The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31). The MTC module 45 may be configured to support high data rate transmissions (at least in some MTC applications).

Base Station

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface).

The operation of the transceiver circuit 51 is controlled by a controller 57 in accordance with software stored in a memory 59. The software includes, among other things, an operating system 61 and a communications control module 62.

The communications control module 62 controls communications with the communication devices 3 (including any MTC devices). The communications control module 62 is also responsible for scheduling the resources to be used by the communication devices 3 served by this base station 5. As shown in FIG. 3, the communications control module 62 includes, amongst others, a narrowband module 63 and a scheduling module 64.

The narrowband module 63 is responsible for dividing the system bandwidth into narrowbands for communicating with (MTC) communication devices 3. The scheduling module 64 is responsible for scheduling transmissions for the communication devices 3 in the base station's cell, by generating and sending appropriately formatted control data (e.g. DCI) and by receiving and processing associated acknowledgements (including 'bundled' ACKs/NACKs for multiple downlink transmissions, when appropriate).

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The following is a description of various ways in which MTC devices may perform high data rate transmissions in LTE systems. Specifically, as mentioned above, higher/flexible data rates may be achieved, by HARQ-ACK bundling (for HD-FDD in CE mode A) and/or by employing a larger maximum PDSCH/PUSCH channel bandwidth in connected mode (at least in CE mode A).

Operation—HARQ-ACK Bundling

In LTE, transmission and reception are separated in both frequency and time for HD-FDD UEs, i.e. for communication devices 3 operating in Half Duplex FDD (HD-FDD) mode. However, the base station 5 supports Full Duplex FDD (FD-FDD) mode of operation. Accordingly, even though the base station 5 is capable of simultaneous transmission and reception, each HD-FDD UE needs to listen to the control channel (i.e. MPDCCH) in one subframe (i.e. operating as a receiver only) in order to determine whether it is scheduled to transmit/receive in a subsequent subframe (or subframes) in the uplink/downlink direction. If a particular HD-FDD UE is scheduled for transmission (via an appropriately formatted control information over the MPDCCH), then it needs to change its HD-FDD operation to transmitting mode before it can send uplink data in the subframe(s) identified by the received control information. Once the scheduled data is transmitted, the communication device 3 changes back to receiver mode in order to monitor for further scheduling assignments.

The main benefit of using such a HD-FDD type of operation (and HD-FDD transceiver circuitry) is the reduced complexity (no duplex filter is needed) and associated lower cost of the communication device 3. This may be an important factor in case of at least some MTC devices.

In existing LTE FDD systems, the transmission of downlink (unicast) data requires the receiving communication device 3 to generate and send an appropriate HARQ feedback (Ack/Nack) in the uplink. Hence each HD-FDD UE (e.g. MTC devices) is required to frequently switch from downlink to uplink subframes and vice versa (i.e. back and forth between receiver mode and transceiver mode of operation) even when receiving downlink data. In order to allow sufficient time for a FID-FDD UE to perform a necessary downlink-uplink switching operation (i.e. from receiver mode to transmitter mode), the HD-FDD UE is not expected to receive its downlink data over the last Orthogonal Frequency Division Multiplexing (OFDM) symbol(s) of its allocated downlink subframe that immediately precedes an uplink subframe (over which the HARQ feedback is to be transmitted). This is because the HD-FDD UE uses the last OFDM symbol(s) of its scheduled downlink transmission for switching its transceiver to transmitter mode (in time before the start of the next uplink subframe). Although this results in erroneous reception due to the missed OFDM symbols (and any data included therein), HARQ procedures can beneficially recover any such missed data in later retransmissions (although slightly prolonging the transmission).

In LTE systems, it is possible to schedule as much data as possible in a single subframe (i.e. in one scheduling instance) by assigning a large number of PRBs to a particular communication device 3 (e.g. a HD-FDD UE). This reduces the need for related data transmissions (e.g. HARQ feedback) in subsequent uplink subframes, and thereby also reduces the need for frequent switching between downlink and uplink subframes (between receiver and transmitter mode of operation). However, because the number of PRBs per narrowband is limited to 6 RBs (in case of a 1.4 MHz narrowband bandwidth), this approach has only a limited potential in case of MTC devices.

Beneficially, however, the need for frequent switching from downlink-to-uplink (and associated switching in HD-FDD operation) may be avoided using bundled HARQ feedback, which in turn also improves the overall data rate for bandwidth limited HD-FDD UEs.

FIG. 4 illustrates details of an exemplary HARQ bundling technique. Effectively, in case of HARQ bundling, the communication device 3 is configured to derive a single acknowledgement feedback by performing a logical "AND" operation for multiple respective ACKs/NACKs for multiple downlink subframes (where data transmissions in each subframe result in a single 'ACK' or 'NACK' for that subframe depending on whether or not the transmission was successful). The communication device 3 is configured to transmit an 'ACK' to the base station 5 if all associated downlink transmissions succeed, otherwise transmit a 'NACK' if one or more associated downlink transmissions fail.

In this example, communication resources are allocated to the communication device 3 by transmitting an appropriately formatted DCI format over the MPDCCH 70. For example, the DCI may be used to 'cross schedule' downlink data for the PDSCH 71 in the second subframe following a subframe in which the DCI format is transmitted. However, in this example, the communication device 3 is scheduled further downlink data (via a further DCI) via the MPDDCH 70 in the subframe following the PDSCH 71 (which further downlink data is transmitted in second subframe following the subframe in which the further DCI format is transmitted). By performing HARQ bundling, the communication device 3 can beneficially avoid having to switch to HD-FDD transmitter mode until both downlink transmissions are complete, and still be able to provide sufficient feedback for both downlink transmissions (when bundling for two subframes). As can be seen in FIG. 4, the bundled HARQ feedback (Ack/Nack) is transmitted via the PUCCH 72 (in an uplink subframe following the last scheduled downlink PDSCH 71). It will be appreciated that the bundled HARQ feedback may be sent in the first 'UL' subframe following the last scheduled downlink PDSCH 71 (if that subframe carries the PUCCH 72) although in FIG. 4 the bundled HARQ feedback is sent in a later subframe.

The following is a detailed description of some possible ways in which multiple downlink subframes can be scheduled for a communication device 3 in the system 1 shown in FIG. 1. In the following examples, the communication device 3 falls into the fourth category of UEs (FeMTC devices), and it is equipped with a transceiver 31 that is capable of a HD-FDD operation. However, the communication device 3 may also fall into the first category of UEs (e.g. mobile telephone 3-1), and in some examples, into the second or third category of UEs (e.g. NB-IoT devices/(e) MTC devices). It will be appreciated that the communication device 3 may be operating without any or with only a minor coverage enhancement (referred to as 'CE mode A' operation).

<One DCI Per Subframe>

In a first option, the base station 5 (using its scheduling module 64) is configured to schedule, for a particular communication device 3, downlink transmissions in a particular (single) downlink subframe using one DCI format (i.e. one DCI per every scheduled subframe). Thus, when scheduling a sequence of subframes for carrying downlink data to that communication device 3, the base station 5 (scheduling module 64) generates and sends, over the MPDCCH 70 (or PDCCH in case of non-MTC UEs), a plurality of appropriately configured DCI formats, each DCI format indicating one respective subframe of the scheduled sequence of subframes (also indicating the allocated downlink resources, i.e. PRBs, within that subframe). The communication device 3 receives (using its receiver 31 in HD-FDD reception mode), the DCI formats by listening to the MPDCCH 70 and (using its communication control module 42) determines the downlink allocations (which subframes/PRBs) by processing the received DCI formats. Whilst still in HD-FDD reception mode, the communication device 3 receives, via the PDSCH 71, the downlink data in each downlink subframe indicated by an associated DCI format.

In this case, since HARQ bundling is used, the communication device 3 (using its HARQ module 44) generates and transmits (via the PUCCH 72) an 'ACK' if all scheduled downlink transmissions were received successfully, and generates and transmits an 'NACK' if one or more scheduled downlink transmissions failed to receive correctly. Specifically, as shown in FIG. 5 as an example, if the mobile device 3 needs to send a bundled HARQ feedback via the PUCCH 72 in uplink subframe with index 'n', then the last scheduled downlink transmission to this particular communication device 3 is scheduled for the downlink subframe with index 'n−4'. Therefore, if the communication device 3 does not receive any DCI format after downlink subframe 'n−4', then it has enough time to switch to transmission mode before subframe 'n'.

It will be appreciated that a so-called downlink assignment index (DAI) may also be included in each DCI format in order to indicate the (total or remaining) number of subframes being scheduled to the communication device before it needs to provide a HARQ feedback. Beneficially, it allows the communication device 3 to provide appropriate HARQ feedback (e.g. MACK) and in the appropriate uplink subframe 'n' even if one of the DCI formats is miss-detected, because the communication device 3 would still be able to determine the correct subframe (relative to the last scheduled downlink subframe) for sending the HARQ feedback.

If a DAI is used, it may be implemented using any of the following possibilities:

Assignments on a set of fixed predefined subframes are bundled (for example sets of subframes [2, 5, 8], [3, 6, 9], and [1, 4, 7]) where the last assignment of PDSCH in a particular set is used as subframe 'n–4' and HARQ feedback is transmitted on uplink subframe 'n'.

Using an equation such as $$(10n_f + \lfloor n_s/2 \rfloor) \bmod 4 = 0 \quad \text{[Math. 1]}$$

where $n_f$ is the system frame number (SFN) and floor $(n_s/2)$ is the subframe number. In this case, the HARQ feedbacks arising from every four consecutive subframes are bundled.

The DCI format may be configured to signal how many consecutive scheduling assignments (e.g. from a starting assignment) are bundled. For example, using two bits, the value '00' may indicate one assignment, the value '01' may indicate two assignments, the value '10' may indicate three assignments, and the value '11' may indicate four assignments. In addition, an extra bit may be used for identifying the starting assignment (e.g. the value '1'=ON; the value '0'=OFF).

The DCI format may be configured to signal a counter which is decremented with every assignment. For example, in the case of four assignments two bits may be used, the value of which can be decremented as: 11→10→01→00 ('00' denoting the last assignment). In this case as well, an extra bit may be used for identifying the starting assignment (e.g. '1'=ON; '0'=OFF).

The DCI format may be configured to signal a counter indicates (combines) both the total number of assignments and the place of the current assignment in the sequence. For example, in the case of four assignments three bits may be used, the value of which can be interpreted as follows: 000→one assignment; 001→the first in a sequence of two assignments; 010→the second in a sequence of two assignments; 011→the first in a sequence of four assignments; 100→the second in a sequence of four assignments; 101→the third in a sequence of four assignments; and 110→the fourth in a sequence of four assignments. This possibility is captured in Table 1.

TABLE 1 exemplary DAI signalling

| Number of Assignments | Assignment number | | | |
|---|---|---|---|---|
| | 0 | 1 | 2 | 3 |
| 1 | 0 | | | |
| 2 | 1 | 2 | | |
| 4 | 3 | 4 | 5 | 6 |

The DCI format may be configured to signal a bit pattern representing: a starting assignment; a middle assignment; or an end assignment. For example, if the starting assignment is indicated using one bit (MSB bit) and the ending assignment is also indicated using one bit (LSB bit), then the value '10' indicates a starting assignment, the value '00' indicates any middle assignment, and the value '01' (or '11') indicates and end assignment (in a sequence of assignments). Therefore, in this case, '11' denotes a single scheduling assignment (both the start and the end of a 'sequence' of one assignment).

<One DCI Per Multiple Subframes>

In a second option, the base station 5 (using its scheduling module 64) is configured to schedule, for a particular communication device 3, downlink transmissions in multiple downlink subframes using one DCI format (i.e. one DCI per sequence of scheduled subframes). Thus, when scheduling a sequence of subframes for carrying downlink data to that communication device 3, the base station 5 (scheduling module 64) generates and sends, over the MPDCCH 70 (or PDCCH in case of non-MTC UEs), an appropriately configured DCI format identifying the scheduled sequence of subframes (also indicating the allocated downlink resources, i.e. PRBs, within each subframe of the sequence). The communication device 3 receives (using its receiver 31 in HD-FDD reception mode), the DCI format by listening to the MPDCCH 70 and (using its communications control module 42) determines the downlink allocations (which subframes/PRBs) by processing the received DCI format. Whilst still in HD-FDD reception mode, the communication device 3 receives, via the PDSCH 71, the downlink data in each downlink subframe indicated by the received DCI format.

An exemplary implementation is shown in FIG. 6 for illustration purposes. In this example, the communication device 3 receives a DCI format via the MPDCCH 70 in a downlink subframe, and this DCI format allocates, to the communication device 3, resources in four consecutive downlink subframes. Therefore, in this example, the communication device 3 (with its transceiver 31 in HD-FDD reception mode) attempts to receive downlink data over the assigned PDSCH 71 resources in the four subframes identified by the DCI format.

Then, using HARQ bundling, the communication device 3 (using its HARQ module 44) generates and transmits (via the PUCCH 72) an 'ACK' if all scheduled downlink transmissions were received successfully, and generates and transmits an 'NACK' if one or more scheduled downlink transmissions failed to receive correctly. Specifically, in the example shown in FIG. 6, if the communication device 3 needs to send a bundled HARQ feedback via the PUCCH 72 in uplink subframe with index 'n', then the last scheduled downlink transmission to this particular communication device 3 is scheduled for the downlink subframe with index 'n–4'. Therefore, if the communication device 3 does not receive any DCI format after downlink subframe 'n–4', it still has enough time to switch to transmission mode before subframe 'n'.

It will be appreciated that scheduling multiple subframes via a single DCI format makes it possible to avoid frequent switching from downlink-to-uplink subframes and also improves (effectively doubles) the downlink data rate compared to scheduling every subframe via a separate DCI format.

In this case, the DCI format may be configured to indicate the number of subframes being scheduled to that particular communication device 3. It will be appreciated that appropriate signalling information may be included in the DCI format to indicate the number of subframes (e.g. 2 bits of signalling for indicating up to four subframes) scheduled for a particular communication device 3. In this case, when using 2 bits as an example, the signalled values may indicate the number of allocated subframes according to Table 2.

TABLE 2 exemplary DCI format signalling (using 2 bits)

| DCI Format value | Number of scheduled subframes |
| --- | --- |
| 00 | 1 |
| 01 | 2 |
| 10 | 3 |
| 11 | 4 |

It will be appreciated that the number of subframes scheduled for a particular communication device 3 may depend on, for example, channel conditions of that communication device 3, overall system load, requested quality of service, capability of the communication device, and/or the like.

When scheduling multiple subframes via a single DCI format, the base station 5 may be configured to implement one of the following possibilities (which may be different for different UEs):

Transmit a relatively small transport block (TB) on every subframe (e.g. a TB that is not larger than the capacity of a single subframe in the given narrowband). In this case, because the MPDCCH and PDSCH are separate for each TB, the communication device may be able to benefit from early decoding of the data included in the TB.

Transmit a relatively large TB over multiple subframes (e.g. a TB that is larger than the capacity of a single subframe in the given narrowband). In this case, beneficially, there is a channel coding gain due to the large TB size.

Advantageously, using one of the above described DCI formats in conjunction with bundled HARQ feedback, the base station 5 is able to schedule a relatively large amount of resources for a particular communication device 3, in an efficient and flexible manner, and still be able to determine whether any data needs to be retransmitted to that communication device 3.

Operation—PDSCH/PUSCH Channel Bandwidth

Support for higher data rates may also be realised by configuring the base station 5 to operate the PDSCH/PUSCH with increased bandwidth (i.e. a bandwidth higher than 1.4 MHz), at least for HD-FDD transmissions for MTC devices (and other compatible user equipment) operating without any or with only a minor coverage enhancement (referred to as 'CE mode A' operation). It will be appreciated that the option of using an increased PDSCH/PUSCH bandwidth may be combined with the bundled HARQ feedback approach, if appropriate.

It will be appreciated that, based on recent discussions in 3GPP meeting, the target peak data rates for unicast traffic should not be less than 3 Mbps/2 Mbps for DL/UL respectively (for FD-FDD). However, such peak data rates would require at least twice the data rate that can be provided using the current eMTC specified UE bandwidth of 1.4 MHz.

It will be appreciated that such wider bandwidth/high data rate operation may be enabled by the serving base station 5 in the following ways:

Semi-statically (e.g. via RRC): When the serving base station 5 determines that a communication device 3 (MTC device or other UE) is capable of using this feature (e.g. based on signalling from the MTC device), the base station 5 may configure the communication device 3 (e.g. via appropriate RRC signalling) for using a wider bandwidth (wider than 1.4 MHz) for its reception and/or transmission. For example, the bandwidth may be set to a multiple of 1.4 MHz. In this case, however, it will be appreciated that once it is configured for using a particular bandwidth, the communication device 3 will maintain that bandwidth (which may be wider than 1.4 MHz/6 PRBs) for reception even if only a small number of RBs (e.g. less than or equal to 6 PRBs) are scheduled for that communication device 3 in a given scheduling round (or within a given time period). It will be appreciated that the communication device 3 may maintain its configured bandwidth at least until receiving a further RRC message from the base station 5 (configuring a different bandwidth) or until the MTC device moves to a different cell (when the MTC device may switch back to the default 1.4 MHz configuration). Whilst this may not be ideal from the communication device's power consumption point of view, this approach avoids discrepancy between the configuration held in the serving base station 5 and the communication device 3.

Dynamically (e.g. via DCI format): When the serving base station determines that a communication device 3 (MTC device or other UE) is capable of using this feature, the base station 5 may be configured to assign, dynamically, either a regular narrowband of 1.4 MHz (maximum 6 PRBs) or a wider narrowband (having more than 6 PRBs). The base station may do so, for example, by generating and signalling resource allocations to the communication device 3 using appropriately configured DCI format signalling (identifying the number of PRBs included in the 'narrowband' for that communication device 3 in that scheduling round). Beneficially, such dynamic (DCI based) signalling does not require the communication device 3 to increase the number of blind decodings of the MPDCCH compared to the amount of blind decoding required for regular (1.4 MHz) narrowbands. Since in this case the bandwidth is changed dynamically, the communication device 3 may also benefit from power saving/power optimisation because it is able to fall back to regular narrowband operation when a small number of PRBs (not more than 6 PRBs) are assigned to that communication device 3.

The following is a description of some possible ways in which higher data rates may be realised for compatible MTC devices (and other user equipment) by increasing the maximum PDSCH/PUSCH channel bandwidth (either semi-statically or dynamically). It will be appreciated that these options are applicable to Time Division Duplex (TDD), HD-FDD, and FD-FDD transmissions as well.

<Using Legacy System Bandwidths for Defining Narrowband>

In one option, the base station 5 may be configured to reuse legacy (i.e. pre-Rel-13) system bandwidths of 1.4 MHz, 3 MHz, and 5 MHz for its narrowbands as well. However, in this case some MTC devices (e.g. in the second and third UE categories) may not be compatible with some narrowband configurations of this base station 5 (i.e. such 'extended' narrowbands that exceed 6 PRBs/1.4 MHz). Therefore, the base station 5 may be configured to schedule MTC devices in the second and third UE categories only in those narrowbands that do not exceed 1.4 MHz and schedule more enhanced MTC devices (e.g. in the fourth UE category) and conventional. UEs (in the first category) in any narrowband (preferably in the 3 MHz and/or 5 MHz narrowbands if a higher data rate is required).

<Aggregating Narrowbands>

In another option, the base station 5 may be configured to aggregate multiple narrowbands (of 6 RBs/1.4 MHz each) for more enhanced MTC devices (e.g. in the fourth UE category) and for conventional UEs (in the first category). In this case, transmissions for other MTC devices (e.g. in the second and third UE categories) can still be scheduled for a single narrowband (i.e. without any aggregation of narrowbands). Beneficially, each compatible UE/MTC device may be configured to use a larger transmission or reception bandwidth whenever it needs a high data rate (for example two or more consecutive narrowbands may be aggregated to meet the data rate demands of a particular communication device 3). In this case, depending on its data rate needs, each communication device may be scheduled semi-statically or dynamically to use a particular radio frequency and a particular baseband bandwidth (e.g. higher than 1.4 MHz but not exceeding the maximum bandwidth supported by that device).

If this option is followed, the base station 5 (using its narrowband module 63) may aggregate multiple narrowbands, for a particular communication device 3, in a semi-static manner using radio resource control (RRC) signalling. If appropriate, the base station 5 can also change the UE bandwidth for the communication device 3 by changing the number of aggregated narrowbands. In this case, the resource allocation (by the scheduling module 64) may be based on the number of narrowbands configured by RRC signalling. The resource allocation indication may be given by, for example, the formula $\log_2(N_{RB}(N_{RB}+1)/2)$ and/or the like. A benefit associated with this approach is that it can reduce the power consumption by the communication device 3.

As a variant of this option, instead of 1.4 MHz narrowbands, the base station 5 may be configured to aggregate multiple subbands of 5 MHz each for compatible devices (e.g. enhanced MTC devices in the fourth UE category and also for conventional UEs in the first category). In this case, the system bandwidth may be divided into multiple 5 MHz subbands where each subband has its own separate resource allocation. In this case, the base station 5 may be configured to indicate dynamically the index of an assigned subband and RBs within that subband to the communication devices being scheduled.

Alternatively, as generally shown in FIG. 7, the base station 5 (using its scheduling module 64) may use dynamic signalling via the MPDCCH 70 (based on a variant of the DCI format) to indicate the bandwidth (i.e. the level of narrowband aggregation) allocated in that scheduling instance to a particular communication device 3 (denoted 'UE1' in FIG. 7). In FIG. 7, the columns represent consecutive subframes and the rows represent narrowbands in the system bandwidth (each narrowband having a respective associated index between '0' and '7'). In this example, the bandwidth of each narrowband (and hence that of the MPDCCH 70) is 6 RBs (1.4 MHz), i.e. the same as the narrowband bandwidth defined for Rel-13 eMTC.

In this case, the DCI format includes information indicating the number of narrowbands allocated with that DCI format. For example, 2 bits of information may indicate the number of allocated narrowbands (up to four narrowbands, i.e. 4×6=24 RBs) as shown in Table 3.

TABLE 3 exemplary DCI format signalling (using 2 bits)

| DCI Format value | Number of allocated narrowbands |
|---|---|
| 00 | 1 |
| 01 | 2 |
| 10 | 3 |
| 11 | 4 |

The resource allocation indication (e.g. given by the formula $\log_n(N_{RB}(N_{RH}+1)/2)$) may thus be based on the number of narrowbands signalled in the DCI format.

A variant of this dynamic signalling is shown in FIG. 8. In this case, the DCI format includes information indicating the starting narrowband and the number of consecutive PRBs allocated in that scheduling instance to a particular communication device 3. Beneficially, this approach allows a more gradual resource allocation, because (partial) narrowband aggregation can be made with a 1 PRB step (vs. 6 PRBs as above). In this case, the resource allocation indication (e.g. given by the formula $\log_2(N_{RB}(N_{RB}+1)/2)$) indicates a starting PRB and a number of contiguous PRBs allocated. It will be appreciated that the starting PRB can be allocated anywhere in the maximum supported UE bandwidth (calculated from the first PRB of the starting narrowband). If required, the base station 5 may be configured to signal the starting narrowband dynamically, for example, in order to enable frequency selective scheduling. Hence the starting narrowband may be the narrowband which includes the starting PRB of the given resource allocation.

In more detail, the resource allocation for PDSCH/PUSCH may comprise the index of a starting narrowband and the number of contiguous RBs allocated for a given communication device 3. The resource allocation may be implemented, for example, by reusing a legacy eMTC resource allocation method, such as 'DCI Format 6-0A' which is defined in section 5.3.3.1.10 of 3GPP TS 36.212 V13.2.0. This re-used resource allocation is based on the following formula:

$$\left\lceil \log_2 \left\lfloor \frac{N_{RB}^{DL}}{6} \right\rfloor \right\rceil + 5 \text{ bits} \qquad \text{[Math. 2]}$$

It will be appreciated that 5 bits can represent more than 25 RBs (5 MHz), without considering the starting RB (which is automatically given by the index of the starting narrowband). However, in this case, the +5 bits of the resource allocation formula are given by $$\lceil \log_2 25 \rceil \qquad \text{[Math. 3]}$$

for allocating a maximum bandwidth of 5 MHz (25 RBs). Beneficially, therefore, this modified resource allocation method does not have an impact on the size of legacy Rel-13 eMTC resource allocations (such as DCI Format 6-0A).

Accordingly, the DCI size for Rel-1.3 eMTC and FeMTC resource allocations will be same when applying the above resource allocation method. Beneficially, the following techniques may be used to determine which DCI format is being used by the serving base station 5 so that the communication device 3 is able to differentiate between the two DCI formats.

In a first option, the base station 5 (and communication devices 3) may be configured to use the (legacy) field "Frequency hopping flag—1 bit" to differentiate between the two types of DCI formats. This is possible because communication devices 3 that support a larger bandwidth of PDSCH/PUSCH than 1.4 MHz may either not require frequency hopping or, if frequency hopping is required, the frequency hopping can be enabled or disabled using only higher layers (RRC signalling) instead of using a DCI format dynamically. Thus, when a communication device 3 (MTC device/UE) reports to the base station 5 that it supports a larger bandwidth of PDSCH/PUSCH than 1.4 MHz, the base station 5 (and the communication device 3) may be configured to use the field "Frequency hopping flag—1 bit" to differentiate between the two types of DCI formats (rather than to indicate whether or not frequency hopping is employed). For example, when the "Frequency hopping flag—1 bit" is set to a particular value (e.g. '1'), then it can be interpreted to indicate that the above described modified DCI format is being used, and when the flag is set to a different value (e.g. '0'), it can be interpreted to indicate that the legacy DCI format is being used (or vice versa).

In a second option, the base station 5 (and the communication device 3) may be configured to use the fields "Frequency hopping flag—1 bit" and "Repetition number—2 bits" to differentiate between the two types of DCI formats (legacy and modified). This is possible, because repetitions (configured via the "Repetition number—2 bits" field) can achieve more diversity gain together with frequency hopping. Thus, in this option the field "Frequency hopping flag—1 bit" indicates frequency hopping only when repetitions are also configured for a particular communication device 3. However, as long as PDSCH/PUSCH is not repeated in time domain (when the appropriately formatted "Repetition number—2 bits" field indicates no repetitions), the field "Frequency hopping flag—1 bit" may be used for differentiating between the two DCI formats (e.g. in the manner described above for the first option). A consequence of the second option is that the larger bandwidth of PDSCH/PUSCH is only used when there is no repetition in time domain. For example hopping flag (1 bit)='1' can be interpreted to mean legacy Rel-13 DCI format and flag='0' can be interpreted to mean new Rel-14 (modified) DCI format with larger bandwidth, provided that the repetition number is set to "1", i.e. the value '00'. More details about the field 'Repetition number' may be found in section 8.0 of 3GPP TS 36.213 V13.2.0.

In another example, the base station 5 may be configured to use legacy resource assignments for narrowband communication devices 3 but restrict the total assignment for a particular communication device 3 to a maximum of 25 RBs (5 MHz). Beneficially, in this case the PDSCH/PUSCH resource allocations can be based on the base station's system bandwidth (rather than the narrowband bandwidth). Accordingly, this allows reusing legacy resource allocation schemes such as downlink resource allocation 'Type 2' and uplink resource allocation 'Type 0' (with a total assignment not exceeding 25 RBs per UE).

Determining the Start of PUCCH Transmission

In a particularly advantageous example, the following approach may be employed in order to determine the appropriate subframe in which PUCCH transmission starts for HARQ-ACK bundling (e.g. in CE mode A, in case of HD-FDD). This example may be applied for all cases of PUCCH transmissions (with and without repetition).

In this example, the base station 5 transmits a number of data bundles (e.g. PDSCH bundle) to the communication device 3, in a sequence of downlink sub-frames. The communication device 3 is configured to provide a respective bundled ACK/NACK feedback for each data bundle. Beneficially, the communication device 3 and the base station 5 are able to determine an appropriate starting sub-frame, in which respective ACK/NACK feedback for the first PDSCH bundle is expected, based on the bundling configuration applicable for that particular communication device 3 (for example, based on the last sub-frame in which a last data bundle is transmitted, the number of data bundles, and whether or not transmission of the data bundles is repeated). Thus, by determining the appropriate starting sub-frame of the first bundled ACK/NACK transmission, the communication device 3 and the base station 5 have a common understanding of which ACK/NACK is transmitted in which sub-frame. Thus, after transmitting the ACK/NACK feedback for the first PDSCH bundle (with repetitions, if appropriate), the communication device 3 can proceed to transmit the ACK/NACK feedback for any further PDSCH bundle, in the correct sub-frame(s).

In more detail, the communication device 3 (e.g. MTC UE 3-2) is configured to transmit an appropriate HARQ-ACK response on the PUCCH for each PDSCH bundle in sequence, starting with an HARQ-ACK for the first received PDSCH bundle. It will be appreciated that, in this case, the PUCCH transmissions span $$N_{abs\_total}^{PUCCH} \geq N_{bundle} N_{rep}^{PUCCH} \qquad \text{[Math. 4]}$$

consecutive subframes, including any non-BL/CE UL subframes where the communication device 3 postpones the PUCCH transmission (in this example, if $N_{rep}^{PUCCH}>1$). [Math. 5]

For example, if a subframe with index n−4 is the last subframe in which the PDSCH of the last bundle is received by the communication device 3, then the first PUCCH transmission starts at a sub-frame having an index given by the following formula:

$$\begin{array}{ll} n-2 & \text{if } N_{rep}^{PUCCH} > 1 \text{ and } N_{bundle} > 1; \text{ and} \\ n+1-N_{bundle} & \text{otherwise.} \end{array} \qquad \text{[Math. 6]}$$

$N_{bundle}$ is the number of bundles that the communication device 3 received (i.e. the number of bundles for which HARQ feedback needs to be provided);

$$N_{rep}^{PUCCH} \qquad \text{[Math. 7]}$$

is the number of PUCCH repetitions for a single bundle (which is applicable to each bundle); and $$N_{abs\_total}^{PUCCH} \qquad \text{[Math. 8]}$$

is the total number of absolute consecutive subframes (including any non-BL/CE UL subframes) that all PUCCH transmissions span.

Narrowbands

FIG. 9 illustrates an exemplary way in which MTC device compatible narrowbands may be provided in the system shown in FIG. 1.

As part of the 'enhanced' MTC (eMTC) framework, 3GPP defined MTC specific narrowbands as follows:
the size of each narrowband is 6 PRBs;
the total number ($NB_{whole}$) of downlink (DL) narrowbands in the system bandwidth is defined as $$NB_{whole} = \left\lfloor \frac{N_{RB}^{DL}}{6} \right\rfloor;$$  [Math. 9]

the total number ($NB_{whole}$) of uplink (UL) narrowbands in the system bandwidth is defined as $$NB_{whole} = \left\lfloor \frac{N_{RB}^{UL}}{6} \right\rfloor;$$  [Math. 10]

the remaining resource blocks (that are not forming part of any narrowband) are divided evenly at both ends of the system bandwidth (i.e. as equal number of RB near the lowest frequency and near the highest frequency of the system bandwidth), with any extra odd PRB of the system bandwidth (e.g. in case of 3, 5, and 15 MHz system bandwidth) being located at the centre of the system bandwidth; and
the narrowbands are numbered in order of increasing PRB number. Note:

$$N_{RB}^{DL} \text{ and } N_{RB}^{UL}$$  [Math. 11]

stand for the number of PRBs in the system bandwidth (for downlink and uplink, respectively).

As shown in FIG. 9, each narrowband comprises six resource blocks, and there are some remaining resource blocks (less than six resource blocks) that are distributed evenly at the edges of the frequency bandwidth. The system bandwidth comprises a total of $$N_{RB}^{DL} \text{PRBs},$$  [Math. 12]

each PRB having a respective associated resource block index in the range

'0' to '$N_{RB}^{DL}-1$'.  [Math. 13]

In this example, there are a total of eight narrowbands, each having a respective associated index between '0' and '7', numbered in order of increasing PRB number.

Specifically, the total number of narrowbands in the system bandwidth is defined using the following formula:

$$NB_{whole} = \left\lfloor \frac{N_{RB}^{DL}}{6} \right\rfloor$$  [Math. 14]

where $NB_{whole}$ is the total number of 1.4 MHz narrowbands in the system bandwidth (each narrowband consisting of 6 PRBs);

$$N_{RB}^{DL}$$  [Math. 15]

is the total number of downlink (DL) resource blocks in the system bandwidth; and $$\lfloor x \rfloor$$  [Math. 16]

is a flooring function (i.e. the largest integer not greater than 'x').

In this example, the (downlink) system bandwidth in the cell of the base station 5 is fifty PRBs($N_{RB}^{DL}$=50),  [Math. 17]

which corresponds to approximately 10 MHz of frequency bandwidth. Each narrowband comprises six PRBs (i.e. the maximum number of PRBs that a bandwidth limited MTC device is capable of using). It follows therefore that a maximum of eight whole narrowbands can be provided (i.e. $NB_{whole}$=8) which occupy a total of 48 PRBs of the system bandwidth. In addition, the remaining resource blocks are divided into two 'partial narrowbands' each comprising one PRB (at the edges of the system bandwidth). It will be appreciated that, if appropriate, these remaining resource blocks may also be allocated to compatible MTC devices (or other user equipment). Alternatively, the remaining resource blocks may be allocated for use by other UEs (e.g. for non-MTC use) and/or for transmitting control data.

Beneficially, the narrowbands index numbers facilitate efficient assignment of the narrowbands to MTC devices. In this example, the indexing is arranged in order of increasing PRB number. Although not shown in FIG. 9, it will be appreciated that the partial narrowbands may also be provided with their own respective index numbers (e.g. for allocation to NB-IoT devices).

Modifications and Alternatives

Detailed example embodiments have been described above. As those skilled in the art will appreciate, a number of modifications and alternatives can be made to the above example embodiments whilst still benefiting from the inventions embodied therein.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above example embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the example embodiments described above, the base station and the communication device each include transceiver circuitry. Typically, this circuitry will be formed by dedicated hardware circuits. However, in some example embodiments, part of the transceiver circuitry may be implemented as software run by the corresponding controller.

In the above example embodiments, a number of software modules were described. As those skilled in the art will appreciate, the software modules may be provided in compiled or un-compiled form and may be supplied to the base station or the communication device as a signal over a computer network, or on a recording medium. Further, the functionality performed by part or all of this software may be performed using one or more dedicated hardware circuits.

For example, functionality and/or modules described herein may be implemented using one or computer processing apparatus having one or more hardware computer processors programmed using appropriate software instructions to provide the required functionality (e.g. one or more computer processors forming part of the controllers described with reference to the FIG. 2 or 3). It will be further appreciated that all or pan of these functions may be implemented in hardware as dedicated circuitry for example using one or more dedicated integrated circuits such as an application specific integrated circuit (ASIC) or the like.

It will be appreciated that the controllers referred to in the description of the UE and base station (i.e. with reference to FIGS. 2 and 3) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

<Examples of MTC Applications>

It will be appreciated that each communication device may support one or more MTC applications. Some examples of MTC applications are listed in the following table (source: 3GPP TS 22.368 V13.1.0, Annex B). This list is not exhaustive and is intended to be indicative of the scope of machine-type communication applications.

TABLE 4

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ | Sensors |
| Control | Lighting |
| | Pumps |
| | Valves |
| | Elevator control |
| | Vending machine control |
| | Vehicle diagnostics |

TABLE 4-continued

| Service Area | MTC applications |
| --- | --- |
| Metering | Power |
| | Gas |
| | Water |
| | Heating |
| | Grid control |
| | Industrial metering |
| Consumer Devices | Digital photo frame |
| | Digital camera |
| | eBook |

When data transmitted to the machine type communication device in every subframe of the plurality of subframes has been received successfully, the ACK/NACK indication may comprise an acknowledgement (ACK), and when data transmitted to the machine type communication device in one subframe of the plurality of subframes has not been received successfully the ACK/NACK indication may comprise an non-acknowledgement (NACK).

The control information may comprise a single downlink control indication for assigning communication resources in each of the plurality of subframes. In this case, the plurality of subframes may comprise a plurality of consecutive subframes within a single narrowband.

The control information may comprise, for each subframe of the plurality of subframes, a respective downlink control information (DCI) format for allocating a set of PRBs in that subframe. In this case, the control information may comprises, for each subframe, information (e.g. a downlink assignment index, DAI) indicating a total or remaining number of subframes in which communication resources are allocated for the communication device before the communication devices is required to provide feedback.

The control information may include information identifying at least one of: a starting subframe of the plurality of subframes; an ending subframe of the plurality of subframes; a number of subframes in the plurality of subframes.

The subframe in which feedback is sent may be a predetermined number of subframes (e.g. 4) following the last of the plurality of subframes. The feedback may comprise a bundled Hybrid Automatic Repeat Request, HARQ, feedback.

The transceiver of the base station may be operable to transmit (and the transceiver of the machine type communication device may be operable to receive) the generated control information using a machine-type communication (MTC) specific Physical Downlink Control Channel (MPDCCH).

The base station may comprise a base station of a long term evolution (LTE) radio access network. The transceiver of the machine type communication device may be operable to communicate using a reduced bandwidth compared to the cell bandwidth.

In one possibility, the control information may comprise one downlink control indication for assigning communication resources in each of a plurality of subframes; the transceiver may be operable to receive, from the machine type communication device ACK/NACK feedback for data transmitted to the machine type communication device; and the ACK/NACK feedback may comprise a single ACK/NACK indication for acknowledging data transmitted in a plurality of subframes.

The control information may comprise one downlink control indication for assigning communication resources in each of a plurality of narrowbands in the same subframe; and the plurality of narrowbands may comprise a plurality of contiguous narrowbands.

The communication resources may comprise physical resource blocks (PRBs) and the control information may identify a starting PRB, and a total number of contiguous PRBs assigned to the communication device from the starting PRB.

The downlink control indication may reuse a legacy DCI Format (e.g. a modified DCI Format 6-0A) for the assigning of communication resources in each of a plurality of narrowbands in the same subframe. The reused legacy DCI Format uses the formula $$\lceil \log_2 n \rceil \qquad \text{[Math. 18]}$$

for allocating a maximum of 'n' contiguous PRBs. The controller may be operable to differentiate between use of the legacy DCI Format for the assigning of communication resources in each of a plurality of narrowbands in the same subframe and use of the legacy DCI Format for legacy purposes, by using different respective settings of at least one of a (legacy) frequency hopping parameter and a (legacy) repetition number parameter.

Each narrowband may cover a different respective frequency range comprising a predetermined (preferably 6 or 25) number of physical resource blocks (PRBs).

The data may be transmitted in a number of data bundles in sequence (e.g. PDSCH bundles), each data bundle being transmitted in a sequence of downlink sub-frames. In this case, the machine type communication device may be operable to transmit to the base station ACK/NACK feedback, comprising respective ACK/NACK feedback for each bundle. The machine type communication device and the base station may be operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated.

The starting sub-frame may be determined based on the following formula:

$$\begin{array}{ll} n-2 & \text{if } N_{rep}^{PUCCH} > 1 \text{ and } N_{bundle} > 1; \text{ and} \\ n+1-N_{bundle} & \text{otherwise;} \end{array} \qquad \text{[Math. 19]}$$

wherein 'n' is the fourth subframe following a last subframe in which the last data bundle is transmitted; $N_{bundle}$ is the number of data bundles; and $$N_{rep}^{PUCCH} \qquad \text{[Math. 20]}$$

is a number of times a data bundle is transmitted.

Various other modifications will be apparent to those skilled in the art and will not be described in further detail here.

The whole or part of example embodiments disclosed above can be described as, but not limited to, the following supplementary notes.

(Supplementary note 1) A base station for a communication system, wherein the base station comprises:
a controller operable to generate control information for assigning communication resources for transmitting data to a machine type communication device; and
a transceiver operable to: transmit the generated control information to the machine type communication device; transmit data to the machine type communication device using the assigned communication resources; and receive, from the machine type communication device, ACK/NACK feedback for data transmitted to the machine type communication device;
wherein the data is transmitted in a number of data bundles in sequence (e.g. physical downlink shared channel 'PDSCH' bundles), each data bundle being transmitted in a sequence of downlink sub-frames;
wherein the ACK/NACK feedback comprises respective ACK/NACK feedback for each bundle;
wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated.

(Supplementary note 2) The base station according to Supplementary note 1, wherein the controller is operable to determine the starting sub-frame based on the following formula:

$$\begin{array}{ll} n-2 & \text{if } N_{rep}^{PUCCH} > 1 \text{ and } N_{bundle} > 1; \text{ and} \\ n+1-N_{bundle} & \text{otherwise;} \end{array} \qquad \text{[Math. 21]}$$

wherein 'n' is the fourth subframe following a last subframe in which the last data bundle is transmitted; $N_{bundle}$ is the number of data bundles; and $$N_{rep}^{PUCCH} \qquad \text{[Math. 22]}$$

is a number of times a data bundle is transmitted.

(Supplementary note 3) A base station for a communication system, wherein the base station comprises:
a controller operable to generate control information for assigning communication resources for transmitting data to a machine type communication device; and
a transceiver operable to transmit the generated control information to the machine type communication device, to transmit data to the machine type communication device using the assigned communication resources, and to receive, from the machine type communication device ACK/NACK feedback for data transmitted to the machine type communication device;
wherein the ACK/NACK feedback comprises one ACK/NACK indication for acknowledging data transmitted in a plurality of subframes.

(Supplementary note 4) The base station according to Supplementary note 3, wherein when data transmitted to the machine type communication device in every subframe of the plurality of subframes has been received successfully, the ACK/NACK indication comprises an acknowledgement (ACK), and when data transmitted to the machine type communication device in one subframe of the plurality of subframes has not been received successfully the ACK/NACK indication comprises an non-acknowledgement (NACK).

(Supplementary note 5) The base station according to Supplementary note 3 or 4 wherein the control information comprises a single downlink control indication for assigning communication resources in each of the plurality of subframes.

(Supplementary note 6) The base station according to Supplementary note 5, wherein the plurality of subframes comprise a plurality of consecutive subframes within a single narrowband.

(Supplementary note 7) The base station according to Supplementary note 3 or 4, wherein the control information comprises, for each subframe of the plurality of subframes, a respective downlink control information, DCI, format for allocating a set of physical resource blocks, PRBs, in that subframe.

(Supplementary note 8) The base station according to Supplementary note 7, wherein the control information comprises, for each subframe, information (e.g. a downlink assignment index, DAI) indicating a total or remaining number of subframes in which communication resources are allocated for the communication device before the communication devices is required to provide feedback.

(Supplementary note 9) The base station according to any one of Supplementary notes 3 to 8, wherein the control information includes information identifying at least one of: a starting subframe of the plurality of subframes; an ending subframe of the plurality of subframes; a number of subframes in the plurality of subframes.

(Supplementary note 10) The base station according to any one of Supplementary notes 1 to 9, wherein the transceiver is operable to transmit the generated control information using a machine-type communication, MTC, specific Physical Downlink Control Channel, MPDCCH.

(Supplementary note 11) The base station according to any one of Supplementary notes 1 to 10, wherein the subframe in which feedback is sent is a predetermined number of subframes (e.g. 4) following the last of the plurality of subframes.

(Supplementary note 12) The base station according to any one of Supplementary notes 1 to 11, wherein the feedback comprises a bundled Hybrid Automatic Repeat Request, HARQ, feedback.

(Supplementary note 13) The base station according to any one of Supplementary notes 1 to 12, comprising a base station of a long term evolution, LTE, radio access network.

(Supplementary note 14) A base station for a communication system, wherein the base station comprises:
- a controller operable to generate control information for assigning communication resources for transmitting data to a machine type communication device, wherein the control information comprises one downlink control indication for assigning at least one of: (i) communication resources in each of a plurality of subframes; and (ii) communication resources in each of a plurality of narrowbands in the same subframe; and
- a transceiver operable to transmit the generated control information to the machine type communication device, to transmit data to the machine type communication device using the assigned communication resources.

(Supplementary note 15) The base station according to Supplementary note 14, wherein the control information comprises one downlink control indication for assigning communication resources in each of a plurality of subframes; wherein the transceiver is operable to receive, from the machine type communication device ACK/NACK feedback for data transmitted to the machine type communication device; and wherein the ACK/NACK feedback comprises a single ACK/NACK indication for acknowledging data transmitted in a plurality of subframes.

(Supplementary note 16) The base station according to Supplementary note 14 or 15, wherein the control information comprises one downlink control indication for assigning communication resources in each of a plurality of narrowbands in the same subframe; and wherein the plurality of narrowbands comprises a plurality of contiguous narrowbands.

(Supplementary note 17) The base station according to Supplementary note 16, wherein the communication resources comprise physical resource blocks, PRBs, and wherein the control information identifies a starting PRB, and a total number of contiguous PRBs assigned to the communication device from the starting PRB.

(Supplementary note 18) The base station according to Supplementary note 15, wherein the downlink control indication reuses a legacy DCI Format (e.g. a modified DCI Format 6-0A) for the assigning of communication resources in each of a plurality of narrowbands in the same subframe.

(Supplementary note 19) The base station according to Supplementary note 18, wherein the reused legacy DCI Format uses the formula $$\lceil \log_2 n \rceil \qquad \text{[Math. 23]}$$

for allocating a maximum of 'n' contiguous PRBs.

(Supplementary note 20) The base station according to Supplementary note 18 or 19, wherein the controller is operable to differentiate between use of the legacy DCI Format for the assigning of communication resources in each of a plurality of narrowbands in the same subframe and use of the legacy DCI Format for legacy purposes, by using different respective settings of at least one of a (legacy) frequency hopping parameter and a (legacy) repetition number parameter.

(Supplementary note 21) The base station according to Supplementary note 16 or 17, wherein each narrowband covers a different respective frequency range comprising a predetermined (preferably 6 or 25) number of physical resource blocks, PRBs.

(Supplementary note 22) The base station according to any one of Supplementary notes 16 to 21, wherein the controller is configured to operate a cell having a cell bandwidth, and wherein the cell bandwidth comprises a total number of narrowbands that is given by a formula as follows:

$$NB_{whole} = \left\lfloor \frac{N_{RB}}{n} \right\rfloor \qquad \text{[Math. 24]}$$

where $NB_{whole}$ is the number of narrowbands in the cell bandwidth, $N_{RB}$ is a number of resource blocks in the cell bandwidth, n is a number of resource blocks in each narrowband; and $$\lfloor x \rfloor \qquad \text{[Math. 25]}$$

is a floor function (i.e. the largest integer not greater than 'x').

(Supplementary note 23) The base station according to Supplementary note 3 or 14, wherein the data is transmitted in a number of data bundles in sequence (e.g. physical downlink shared channel 'PDSCH' bundles), each data bundle being transmitted in a sequence of downlink subframes; wherein the transceiver is operable to receive ACK/NACK feedback, comprising respective ACK/NACK feedback for each bundle; and wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated.

(Supplementary note 24) The base station according to any one of Supplementary notes 14 to 23, wherein the transceiver is operable to transmit the generated control information using a machine-type communication, MTC, specific Physical Downlink Control Channel, MPDCCH.

(Supplementary note 25) A machine type communication device for a communication system, wherein the machine type communication device comprises:
a transceiver operable to receive:
control information for assigning communication resources for transmitting data to the machine type communication device; and
data using the assigned communication resources, wherein the data is transmitted in a number of data bundles in sequence (e.g. physical downlink shared channel 'PDSCH' bundles), each data bundle being transmitted in a sequence of downlink sub-frames; and
a controller operable to generate ACK/NACK feedback for data received by the machine type communication device, wherein the ACK/NACK feedback comprises respective ACK/NACK feedback for each bundle;
wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated; and
wherein the transceiver is operable to transmit, to the base station, the generated feedback based on the determined starting sub-frame.

(Supplementary note 26) The machine type communication device according to Supplementary note 25, wherein the controller is operable to determine the starting sub-frame based on the following formula:

$$n - 2 \quad \text{if } N_{rep}^{PUCCH} > 1 \text{ and } N_{bundle} > 1; \text{ and} \quad [\text{Math. 26}]$$
$$n + 1 - N_{bundle} \quad \text{otherwise;}$$

wherein 'n' is the fourth subframe following a last sub-frame in which the last data bundle is transmitted;
$N_{bundle}$ is the number of data bundles; and
$$N_{rep}^{PUCCH} \quad [\text{Math. 27}]$$
is a number of times a data bundle is transmitted.

(Supplementary note 27) A machine type communication device for a communication system, the machine type communication device comprising:
a transceiver operable to receive:
control information for assigning communication resources for transmitting data to the machine type communication device; and
data using the assigned communication resources; and
a controller operable to generate ACK/NACK feedback for data received by the machine type communication device, wherein the ACK/NACK feedback comprises one ACK/NACK indication for acknowledging data transmitted in a plurality of subframes; and
wherein the transceiver is operable to transmit, to the base station, the generated feedback.

(Supplementary note 28) The machine type communication device according to Supplementary note 27, wherein when data transmitted to the machine type communication device in every subframe of the plurality of subframes has been received successfully, the ACK/NACK indication comprises an acknowledgement (ACK), and when data transmitted to the machine type communication device in one subframe of the plurality of subframes has not been received successfully the ACK/NACK indication comprises an non-acknowledgement (NACK).

(Supplementary note 29) The machine type communication device according to Supplementary note 27 or 28, wherein the control information comprises a single downlink control indication for assigning communication resources in each of the plurality of subframes.

(Supplementary note 30) The machine type communication device according to Supplementary note 29, wherein the plurality of subframes comprise a plurality of consecutive subframes within a single narrowband.

(Supplementary note 31) The machine type communication device according to Supplementary note 27 or 28, wherein the control information comprises, for each subframe of the plurality of subframes, a respective downlink control information, DCI, format for allocating a set of physical resource blocks, PRBs, in that subframe.

(Supplementary note 32) The machine type communication device according to Supplementary note 31, wherein the control information comprises, for each subframe, information (e.g. a downlink assignment index, DAI) indicating a total or remaining number of subframes in which communication resources are allocated for the communication device before the communication devices is required to provide feedback.

(Supplementary note 33) The machine type communication device according to any one of Supplementary notes 27 to 32, wherein the control information includes information identifying at least one of: a starting subframe of the plurality of subframes; an ending subframe of the plurality of subframes; a number of subframes in the plurality of subframes.

(Supplementary note 34) The machine type communication device according to any one of Supplementary notes 27 to 33, wherein the transceiver is operable to receive the control information using a machine-type communication, MTC, specific Physical Downlink Control Channel, MPDCCH.

(Supplementary note 35) The machine type communication device according to any one of Supplementary notes 27 to 34, wherein the subframe in which feedback is sent is a predetermined number of subframes (e.g. 4) following the last of the plurality of subframes.

(Supplementary note 36) The machine type communication device according to any one of Supplementary notes 27 to 35, wherein the ACK/NACK feedback comprises a bundled Hybrid Automatic Repeat Request, HARQ, feedback.

(Supplementary note 37) The machine type communication device according to any one of Supplementary notes 27 to 36, wherein the transceiver is operable to communicate using a reduced bandwidth compared to the cell bandwidth.

(Supplementary note 38) A machine type communication device for a communication system, wherein the machine type communication device comprises:
a transceiver operable to receive, from a base station:
control information for assigning communication resources for transmitting data to the machine type communication device, wherein the control information comprises one downlink control indication for assigning at least one of: (i) communication resources in each of a plurality of subframes; and (ii)

communication resources in each of a plurality of narrowbands in the same subframe; and data using the assigned communication resources.

(Supplementary note 39) The machine type communication device according to Supplementary note 38, wherein the control information comprises one downlink control indication for assigning communication resources in each of a plurality of subframes; wherein the transceiver is operable to transmit, to the base station ACK/NACK feedback for data transmitted by the base station to the machine type communication device; and wherein the ACK/NACK feedback comprises a single ACK/NACK indication for acknowledging data transmitted in a plurality of subframes.

(Supplementary note 40) The machine type communication device according to Supplementary note 38 or 39, wherein the control information comprises one downlink control indication for assigning communication resources in each of a plurality of narrowbands in the same subframe; and wherein the plurality of narrowbands comprises a plurality of contiguous narrowbands.

(Supplementary note 41) The machine type communication device according to Supplementary note 40, wherein the communication resources comprise physical resource blocks, PRBs, and wherein the control information identifies a starting PRB, and a total number of contiguous PRBs assigned to the communication device from the starting PRB.

(Supplementary note 42) The machine type communication device according to Supplementary note 38, 40, or 41, wherein each narrowband covers a different respective frequency range comprising a predetermined (preferably 6 or 25) number of physical resource blocks, PRBs.

(Supplementary note 43) The machine type communication device according to Supplementary note 27 or 38, wherein the data is transmitted, by the base station, in a number of data bundles in sequence (e.g. physical downlink shared channel 'PDSCH' bundles), each data bundle being transmitted in a sequence of downlink sub-frames; wherein the transceiver is operable to transmit ACK/NACK feedback, comprising respective ACK/NACK feedback for each bundle; and wherein the controller is operable to determine a starting sub-frame in which respective ACK/NACK feedback for a first PDSCH bundle is expected based on the last sub-frame in which a last data bundle is transmitted, the number of data bundles, and whether or not transmission of the data bundles is repeated.

(Supplementary note 44) The machine type communication device according to any one of Supplementary notes 38 to 43, wherein the transceiver is operable to receive the control information using a machine-type communication, MTC, specific Physical Downlink Control Channel, MPDCCH.

(Supplementary note 45) A system comprising: the base station according to any one of Supplementary notes 1 to 24; and the machine type communication device according to any one of Supplementary notes 25 to 44.

(Supplementary note 46) A method performed by a base station of a communication system, the method comprising:
generating control information for assigning communication resources for transmitting data to a machine type communication device;
transmitting the generated control information to the machine type communication device;
transmitting data to the machine type communication device using the assigned communication resources; and
receiving, from the machine type communication device, ACK/NACK feedback for data transmitted to the machine type communication device;
wherein the data is transmitted in a number of data bundles in sequence (e.g. physical downlink shared channel 'PDSCH' bundles), each data bundle being transmitted in a sequence of downlink sub-frames;
wherein the ACK/NACK feedback comprises respective ACK/NACK feedback for each bundle; and
wherein the method comprises determining a starting sub-frame in which respective ACK/NACK feedback for a first PDSCH bundle is expected based on the last sub-frame in which a last data bundle is transmitted, the number of data bundles, and whether or not transmission of the data bundles is repeated.

(Supplementary note 47) A method performed by a communication device of a communication system, the method comprising:
receiving:
control information for assigning communication resources for transmitting data to the machine type communication device; and
data using the assigned communication resources, wherein the data is transmitted in a number of data bundles in sequence (e.g. physical downlink shared channel 'PDSCH' bundles), each data bundle being transmitted in a sequence of downlink sub-frames;
generating ACK/NACK feedback for data received by the machine type communication device, wherein the ACK/NACK feedback comprises respective ACK/NACK feedback for each bundle;
determining a stalling sub-frame in which respective ACK/NACK feedback for a first PDSCH bundle is expected based on the last sub-frame in which a last data bundle is transmitted, the number of data bundles, and whether or not transmission of the data bundles is repeated; and
transmitting, to the base station, the generated feedback based on the determined starting sub-frame.

(Supplementary note 48) A method performed by a base station of a communication system, the method comprising:
generating control information for assigning communication resources for transmitting data to a machine type communication device;
transmitting the generated control information to the machine type communication device;
transmitting data to the machine type communication device using the assigned communication resources, and
receiving, from the machine type communication device ACK/NACK feedback for data transmitted to the machine type communication device;
wherein the ACK/NACK feedback comprises one ACK/NACK indication for acknowledging data transmitted in a plurality of subframes.

(Supplementary note 49) A method performed by a base station of a communication system, the method comprising:
generating control information for assigning communication resources for transmitting data to a machine type communication device, wherein the control information comprises one downlink control indication for assigning at least one of: (i) communication resources in each of a plurality of subframes; and (ii) communication resources in each of a plurality of narrowbands in the same subframe; and transmitting the generated control information to the machine type communication device, to transmit data to the machine type communication device using the assigned communication resources.

(Supplementary note 50) A method performed by a communication device of a communication system, the method comprising:
receiving:
control information for assigning communication resources for transmitting data to a machine type communication device; and
data using the assigned communication resources;
generating ACK/NACK feedback for data received by the machine type communication device, wherein the ACK/NACK feedback comprises one ACK/NACK indication for acknowledging data transmitted in a plurality of subframes; and transmitting, to the base station, the generated feedback.

(Supplementary note 51) A method performed by a communication device of a communication system, the method comprising:
receiving, from a base station:
control information for assigning communication resources for transmitting data to the machine type communication device, wherein the control information comprises one downlink control indication for assigning at least one of: (i) communication resources in each of a plurality of subframes; and (ii) communication resources in each of a plurality of narrowbands in the same subframe; and
data using the assigned communication resources.

(Supplementary note 52) A computer implementable instructions product comprising computer implementable instructions for causing a programmable communications device to perform the method of any one of Supplementary notes 46 to 51.

The invention claimed is:

1. A method performed by a base station, the method comprising:
transmitting, to a mobile terminal, downlink control information (DCI) for assigning communication resources in at least one subframe for transmitting data, wherein the DCI includes information indicating a number of transport blocks in the at least one subframe;
transmitting, to the mobile terminal, the data using the communication resources; and
receiving, from the mobile terminal, bundled information of Hybrid Automatic Repeat Request (HARQ)-Acknowledgement (ACK) feedback for acknowledging receipt of the data by the mobile terminal,
wherein, in a case where transport blocks are received, by the mobile terminal, for the number of transport blocks indicated by the DCI, the bundled information of HARQ-ACK feedback includes an ACK, and in a case where transport blocks are not received, by the mobile terminal, for the number of transport blocks indicated by the DCI, the bundled information of HARQ-ACK feedback includes a negative ACK (NACK).

2. The method according to claim 1, wherein
the DCI includes information indicating a predetermined number of subframes following a last subframe of subframes in which the transport blocks are received by the mobile terminal, and
the bundled information of HARQ-ACK feedback is transmitted in a subframe indicated by the information.

3. A method performed by a mobile terminal, the method comprising:
receiving, from a base station, downlink control information (DCI) for assigning communication resources in at least one subframe for receiving data, wherein the DCI includes information indicating a number of transport blocks in the at least one subframe;
receiving, from the base station, the data using the communication resources; and
transmitting, to the base station, bundled information of Hybrid Automatic Repeat Request (HARQ)-Acknowledgement (ACK) feedback for acknowledging receipt of the data by the mobile terminal,
wherein, in a case where transport blocks are received for the number of transport blocks indicated by the DCI, the bundled information of HARQ-ACK feedback includes an ACK, and in a case where transport blocks are not received, by the mobile terminal, for the number of transport blocks indicated by the DCI, the bundled information of HARQ-ACK feedback includes a negative ACK (NACK).

4. The method according to claim 3, wherein
the DCI includes information indicating a predetermined number of subframes following a last subframe of subframes in which the transport blocks are received by the mobile terminal, and
the bundled information of HARQ-ACK feedback is transmitted in a subframe indicated by the information.

5. A base station comprising:
at least one memory storing instructions; and
at least one processor configured to process the instructions to:
transmit, to a mobile terminal, downlink control information (DCI) for assigning communication resources in at least one subframe for transmitting data, wherein the DCI includes information indicating a number of transport blocks in the at least one subframe,
transmit, to the mobile terminal, the data using the communication resources, and
receive, from the mobile terminal, bundled information of Hybrid Automatic Repeat Request (HARQ)-Acknowledgement (ACK) feedback for acknowledging receipt of the data by mobile terminal,
wherein, in a case where transport blocks are received, by the mobile terminal, for the number of transport blocks indicated by the DCI, the bundled information of HARQ-ACK feedback includes an ACK, and in a case where transport blocks are not received, by the mobile terminal, for the number of transport blocks indicated by the DCI, the bundled information of HARQ-ACK feedback includes a negative ACK (NACK).

6. A mobile terminal comprising:
at least one memory storing instructions; and
at least one processor configured to process the instructions to:
receive, from a base station, downlink control information (DCI) for assigning communication resources in at least one subframe for receiving data, wherein the DCI includes information indicating a number of transport blocks in the at least one subframe,
receive, from the base station, the data using the communication resources, and
transmit, to the base station, bundled information of Hybrid Automatic Repeat Request (HARD)-Acknowledgement (ACK) feedback for acknowledging receipt of the data by the mobile terminal, wherein, in a case where transport blocks are received for the number of transport blocks indicated by the DCI, the bundled information of HARQ-ACK feedback includes an ACK, and in a case where transport blocks are not received for the number of transport blocks indicated by the DCI, the bundled information of HARQ-ACK feedback includes a negative ACK (NACK).

* * * * *

UNITED STATES PATENT AND TRADEMARK OFFICE
CERTIFICATE OF CORRECTION

| | | |
|---|---|---|
| PATENT NO. | : 12,015,972 B2 | Page 1 of 1 |
| APPLICATION NO. | : 17/592649 | |
| DATED | : June 18, 2024 | |
| INVENTOR(S) | : Yassin Aden Awad | |

It is certified that error appears in the above-identified patent and that said Letters Patent is hereby corrected as shown below:

In the Claims

In Column 34, Line 65, Claim 6, please delete "(HARD)" and insert --(HARQ)-- after "Request"

Signed and Sealed this
Twenty-fourth Day of September, 2024

Katherine Kelly Vidal
*Director of the United States Patent and Trademark Office*